Figure 1:
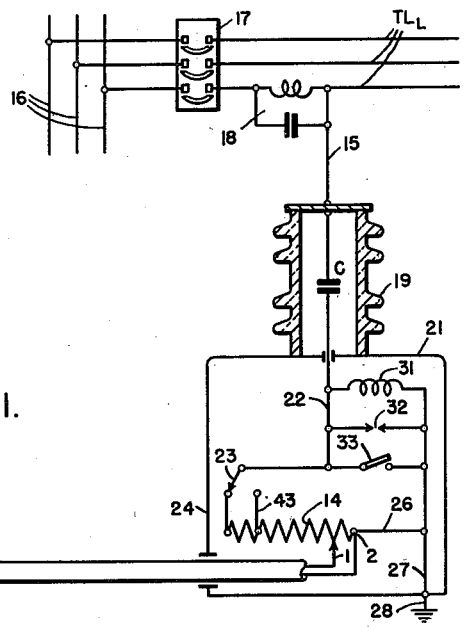

Sept. 16, 1952      B. E. LENEHAN      2,611,022

CARRIER-CURRENT COUPLER

Filed Jan. 26, 1949      4 Sheets-Sheet 1

WITNESSES:
Edward Michaels
Nw. C. Groome

INVENTOR
BERNARD E. LENEHAN.
BY O. B. Buchanan
ATTORNEY

Sept. 16, 1952   B. E. LENEHAN   2,611,022
CARRIER-CURRENT COUPLER
Filed Jan. 26, 1949   4 Sheets-Sheet 2

WITNESSES:
Edward Michaels
Wm. L. Groome

INVENTOR
BERNARD E. LENEHAN.
BY O. B. Buchanan
ATTORNEY

Patented Sept. 16, 1952

2,611,022

UNITED STATES PATENT OFFICE 2,611,022

CARRIER-CURRENT COUPLER

Bernard E. Lenehan, Bloomfield, N. J., assignor to Westinghouse Electric Corporation, East Pittsburgh, Pa., a corporation of Pennsylvania Application January 26, 1949, Serial No. 72,894

6 Claims. (Cl. 177—352)

My invention relates to a coupling-device or network, for coupling the carrier-current from a power-line into a coaxial cable, and thence into the carrier-current transmitter-receiver set, or for coupling the transmitter-receiver set, and the lead-in cable through which it delivers its output, to the coupling-capacitor which is connected to the power-line. The power-line is usually a three-phase overhead transmission-line, using the term "transmission-line" in the power-engineer's sense of transmitting electrical power, at a commercial frequency such as 60 cycles, from one place to another place. The carrier-current is a superposed high-frequency current, usually in the frequency-range between 45 and 165 kilocycles (kc.), which is superimposed upon the power-currents for the purpose of intelligence-transmission over the power-line, for various purposes such as protective relaying, metering, remote control, and voice-communication. From the standpoint of the communication (or high-frequency) engineer, the term transmission-line has a different meaning, which is always reserved exclusively for a network or a pair of conductors in which the physical dimensions are comparable to the wavelength of the alternating-current flowing therein, or in which account must be taken of distributed capacitance or leakage. In this specification, the context may have to be relied upon, in some instances, to determine the sense in which the expression transmission-line is used.

Previous to my present invention, in designing coupling-transformers or networks of the class to which my invention relates, it has been the uniform practice to use a coupling-transformer between the lead-in cable and the coupling-capacitor, and to provide the coupling-transformer with a large number of taps, on both its primary and secondary sides, so that it can be used as a substantially matched-impedance coupling between the lead-in cable and the power-line, at any required carrier-current frequency within the range of carrier-current frequencies over which the device is to be used. In matched-impedance couplings, the apparent terminal impedance which is connected to the end of the lead-in cable is equal to the characteristic impedance of the cable, which is substantially a pure resistance, usually of a value of the order of 50 or 60 ohms, in common sizes and lengths of cables; and also the apparent terminal impedance which is connected to the power-line is substantially equal to the impulse-impedance of the power-line, which is substantially the characteristic impedance of the power-line from the standpoint of communication-engineering, this impedance being usually of the order of from 360 to 540 ohms, being commonly figured as either 450 or 500 ohms. When a communication-circuit transmission-line is terminated by a terminal-impedance which is equal to its characteristic impedance, it operates as if it were an infinitely long line, having no reflected, (or backwardly-traveling) wave.

The principal object of my present invention is to provide a much simpler coupling-device or network, in which, in general, mismatched impedances are provided, so that a single primary inductance and a single secondary inductance, with a known coupling-coefficient between them, can be used acceptably to serve a considerable range of carrier-current frequencies.

Heretofore, there were possibly two reasons why a mismatched coupling-transformer was not previously designed for coupling the carrier-current lead-in cable to the power-line. One of these reasons may have been the failure to realize that the lead-in cable is fairly short, considerably less than one wavelength, as a result of which there is not enough time-delay in the cable to produce appreciable echoes or confused signals, if the impedance-mismatch is not too great. Since the cable is short, its power-losses are also relatively small, so that some increase in these losses may well be tolerated, as a result of the mismatching of impedances. The other reason which undoubtedly would have militated against the design of a mismatched-impedance coupling-transformer has been the lack of formulas, and the lack of precedent as to how to use such formulas as have been known, so that the communication-engineer has not had readily available, (if indeed it could be considered to have been available at all), information as to the basis upon which such a transformer-design could be undertaken or carried out.

More specifically, it is an object of my invention to provide a coupling-transformer design, for coupling two communication-circuit transmission-lines through a coupling-capacitor having a capacitance C, so that the coupling-transformer has such secondary inductance $L_s$ that the total secondary-circuit impedance $$(wL_s - 1/wC)$$

is somewhere near zero (or resonance), or, in general, so that $w^2 L_s C = 1 \pm 0.2$ at the minimum frequency of the frequency-range over which any given value of secondary inductance $L_s$ is to be usable. In other words, as will be subsequently explained in connection with Fig. 4, the operating-point is not to be at H, on the resistance-axis OR, but at, or somewhere near, the point G, within the limits stated.

While I am not limited to a transformer having a constant or non-variable primary inductance $L_p$, another object of my invention may be stated to be to provide a coupling-transformer in which a constant value of the primary inductance $L_p$ and a constant value of the secondary inductance $L_s$ will be used over a range of frequencies, under mismatched impedance conditions which are chosen according to my invention so that, even in the center of the frequency-range, the conditions will not necessarily approach matched-impedance conditions. This mismatching of impedance is such as to produce a backward-to-forward standing-wave voltage-ratio $E_B/E_F = b$, in the lead-in cable, which shall have a material value (not zero), and which shall be less than about 0.8, and usually less than 0.6, and shall be usually at least as high as approximately 0.6, or in the range between 0.5 and 0.6, at both of the extreme ends of the frequency-range over which a given secondary inductance $L_s$ is to be operated. Because of the finite value of the standing-wave voltage-ratio $b$, the decibel-loss in the lead-in cable is more than the matched-coupling cable-loss would have been, but not more than 3.2 times (and preferably not more than 2.2 times) said matched-coupling loss, or not more than about 3.2 decibels (db) altogether, or preferably 2.2 db or less.

A further object of my invention is to provide a coupling-transformer for the purpose described, in which the value of the primary inductance $L_p$ is chosen so as to adjust or adapt the characteristic cable-impedance $R_C$ to the power-line impulse-impedance $R_L$, or, more accurately, to adjust the characteristic cable-impedance $R_C$ to the length of the circle-diameter having a value $k^2 w L_s/R_L$, where $k$ is the coupling-coefficient of the coupling-transformer, and $w = 2\pi f$ is the angular velocity depending upon the carrier-current frequency $f$.

A still further object of my invention is to provide a coupling-transformer of the class described, having a constant, or a substantially constant, primary inductance $L_p$, and having a multiple-tap or variable secondary inductance $L_s$, the number of secondary taps being relatively small, so that each tap or terminal of the secondary winding suffices for operation over a material range of frequencies, said range extending both above and below the frequency at which the mismatching of impedances is the least.

With the foregoing and other objects in view, my invention consists in the systems, circuits, combinations, structures, parts, and methods of design and operation, hereinafter claimed, and illustrated in the accompanying drawing, wherein Figure 1 is a diagrammatic view of circuits and apparatus showing my invention in an illustrative form of embodiment.

Figure 2:
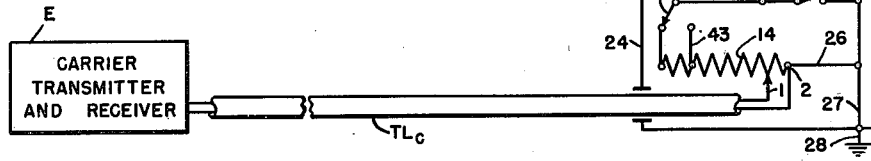
Figure 3:
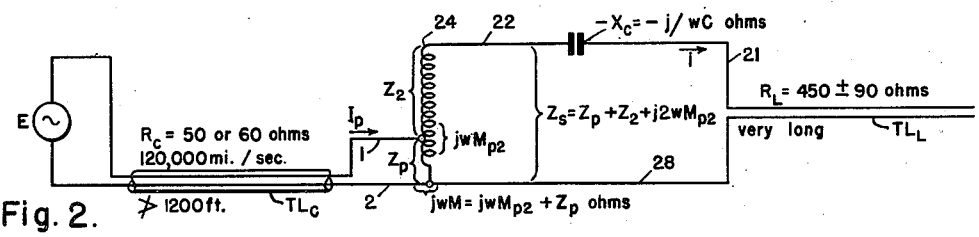
Figure 4:
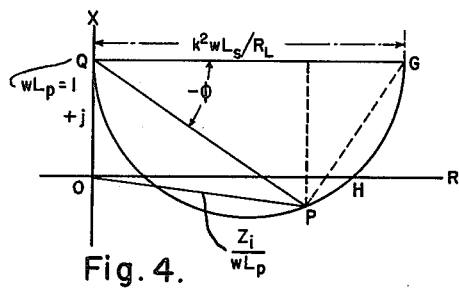
Figure 6:
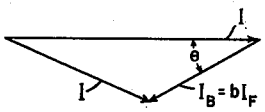
Figure 5:
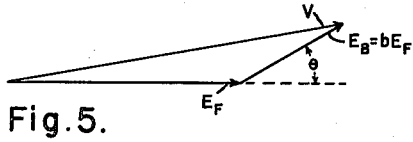
Figure 7:
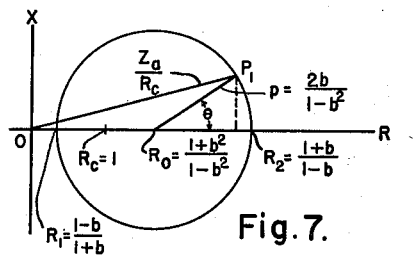
Figure 8:
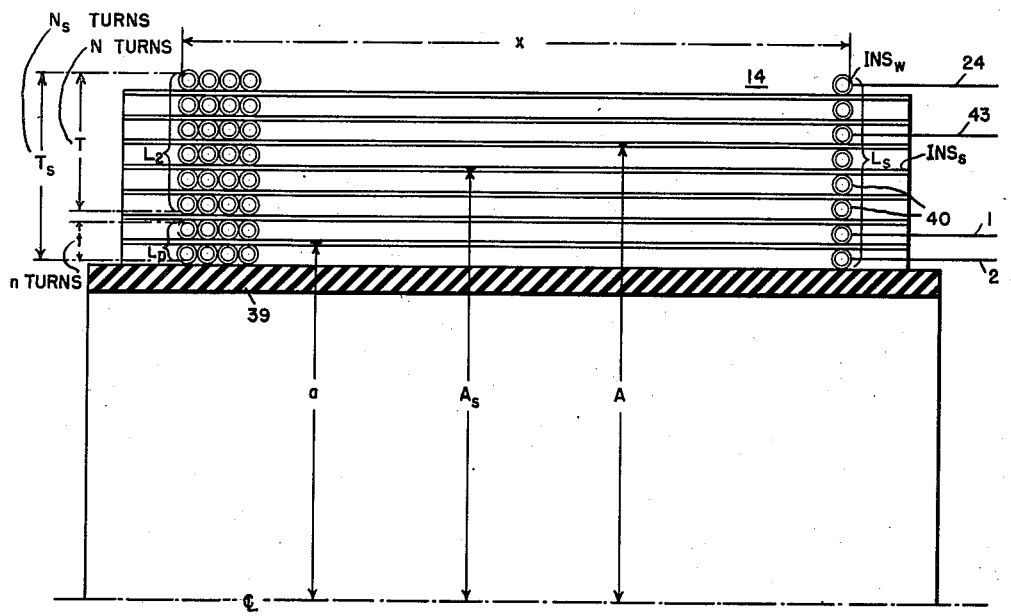
Figure 9:
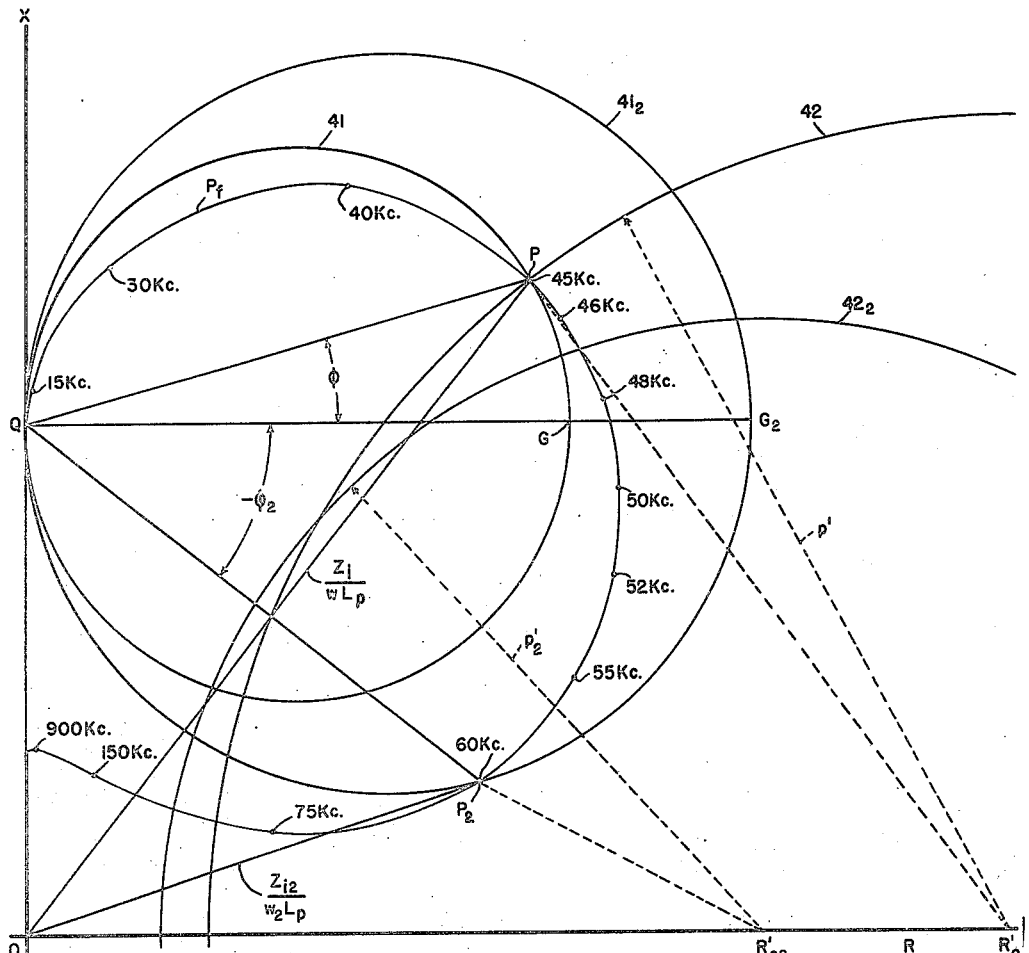
Figure 10:
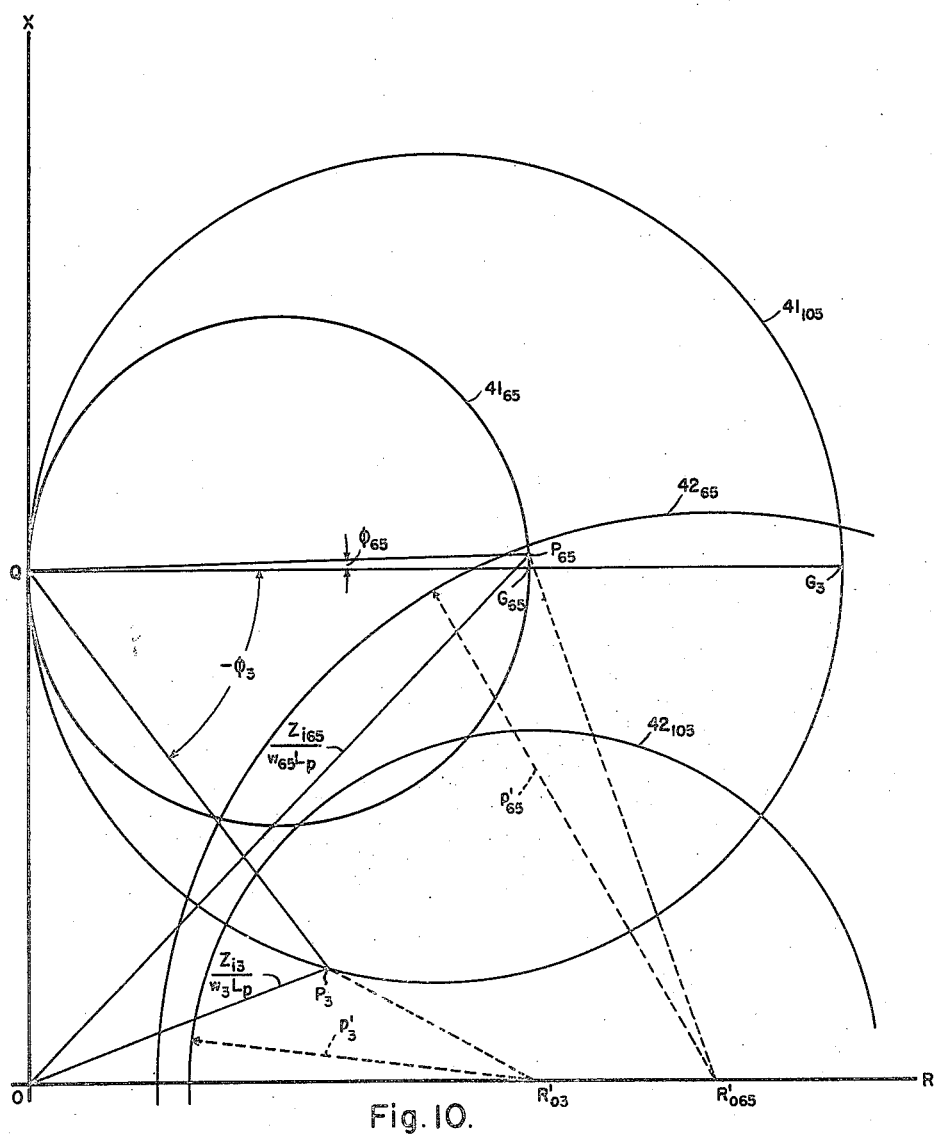

Figs. 2 and 3 are equivalent-circuit diagrams which will be referred to in the explanation of the invention, Fig. 4 is a vector-diagram of the input-impedance $Z_i$ of the coupling-network, in terms of the primary reactance $wL_p$ of the coupling-transformer, Figs. 5 and 6 are vector-diagrams of the voltages and currents, respectively, in the lead-in cable, Fig. 7 is a vector-diagram of the apparent impedance $Z_a$ of the lead-in cable, under unmatched-coupling conditions, in terms of the equivalent (or matched-coupling) impedance $R_C$ of the lead-in cable, Fig. 8 is a diagrammatic enlarged cross-sectional view of the top-half of the coupling-transformer of the illustrative form of embodiment shown in Fig. 1, not to scale, and Figs. 9 and 10 are vector-diagrams illustrative of the over-all performance of the coupling-system.

In Figure 1, I have indicated a block-diagram showing of a carrier transmitter-and-receiver set E, which is connected to the input-end of a lead-in coaxial cable $TL_C$, which serves as a communication-circuit transmission-line for enabling the carrier-set E to be housed in a building (not shown) which is close to, but not exactly underneath, the point where the carrier is to be coupled to one of the circuits of the commercial-frequency three-phase transmission-line or power-line $TL_L$. The output-end of the lead-in cable $TL_C$ serves as the input-terminal 1, 2 of a coupling-network which includes a coupling-transformer 14 and a coupling-capacitor C. The upper terminal 15 of the coupling-capacitor C is connected to one of the conductors of the power-line $TL_L$. Only one terminal of the power-line $TL_L$ is shown, this terminal being connected to a station-bus 16 through a circuit-breaker 17. The carrier-current is substantially confined to the one conductor of the transmission-line $TL_L$ by means of a common form of carrier-current trap 18, which is connected in the line-conductor between the coupling-point 15 and the station-bus 16 at the illustrated terminal of the power-line $TL_L$.

In the illustrated form of embodiment of my invention, as shown in Fig. 1, the coupling-capacitor C is housed, in a known manner, in an insulating housing 19 which is mounted on the top of a diagrammatically indicated box or base 21, which houses the coupling-transformer 14 and certain other equipment, as will now be described. The lower terminal 22 of the coupling-capacitor C is connected, through a switch 23, to a terminal or end-tap 24 of the secondary side of the coupling-transformer 14. This coupling-transformer is shown, by way of giving a concrete illustration, in Fig. 1, as an autotransformer, having the two terminals 24 and 2, and an intermediate primary-winding tap 1, which is indicated, in Fig. 1, as being adjustable, although, in general, the primary-winding adjustment will not be needed at all, and, if used at all, it will provide only a small percentage-change in the number of primary turns. The autotransformer-terminal 2 is illustrated as being connected, through a conductor 26, to a ground-wire 27, which is grounded as shown at 28.

Also included in the coupling-capacitor base 21, there is usually provided a 60-cycle by-pass or drain-coil 31, which is connected between the lower capacitor-terminal 22 and the ground-lead 27, this drain-coil being shunted also by a protective gap 32 and a grounding switch 33.

The coupling-transformer 14, as indicated in Fig. 1, usually has one or more intermediate secondary taps 43, which can be selected by the selector-switch 23, as will be subsequently described.

The equivalent carrier-current circuit for the apparatus shown in Fig. 1, is diagrammatically indicated in Fig. 2. In this figure, the carrier-current set E is shown simply as an alternating source E. This source would have a frequency of anywhere from 45,000 cycles to 165,000 cycles, a choice of frequencies being necessary so that a separate carrier-frequency can be assigned to each section of the power-line TL$_L$. The lead-in or coupling-cable TL$_C$ has a length which is, in general, not over 1200 feet, and the velocity of wave-propagation in this cable may be something of the order of 120,000 miles per second, so that it will be seen that the length of this cable is short, when measured in terms of the carrier-current wavelength. The length of the power-line TL$_L$, however, is very long, when measured in terms of the carrier-current wavelength.

In Fig. 2, the self-impedance of the autotransformer 14 is divided into three parts, namely the primary impedance $Z_p$ of the portion of the transformer included between the terminals 1 and 2, a second partial-impedance portion $Z_2$ which embraces the turns which are included between the terminals 1 and 24, and the over-all secondary impedance $Z_s$ which is the entire secondary impedance of the turns included between the two terminals 2 and 24. The mutual inductance between the two portions $Z_p$ and $Z_2$ is indicated as $M_{p2}$, and the mutual inductance between the primary and secondary portions $Z_p$ and $Z_s$ is indicated as $M$. The over-all mutual impedance is therefore $jwM = jwM_{p2} + Z_p$ ohms. The over-all secondary impedance is $Z_s = Z_p + Z_2 + j2wM_{p2}$ ohms. In this figure, the reactance of the coupling-capacitor C is indicated as $-X_C = -j/wC$ ohms, the minus sign being indicated because it is a capacitive reactance rather than an inductive reactance.

In any practical case, we may assume that the primary and secondary resistances $L_p$ and $L_s$ of the coupling-transformer 14 are negligibly small as compared to the characteristic impedances or impulse-impedances $R_C$ and $R_L$ of the lead-in cable TL$_C$ and the power-line TL$_L$, respectively; or else the impulse-impedances may be considered as being $(R_C + R_p)$ and $(R_L + R_s)$, respectively. Neglecting the transformer-resistances, therefore, the equivalent circuit for Fig. 2 is approximately as shown in Fig. 3.

The input-impedance of the network is the equivalent network-impedance as seen when looking into the network at the input-terminals 1, 2 in Fig. 3. It is, (1)
$$Z_i = R_i + jX_i \text{ ohms}$$
$$= jw(L_p - M) + \cfrac{1}{\cfrac{1}{jwM} + \cfrac{1}{R_L + jw(L_s - M) - j/wC}}$$
$$= jw(L_p - M) + \frac{jwM(R_L + jwL_s - j/wC - jwM)}{R_L + jwL_s - j/wC}$$
$$= jw(L_p - M) + jwM + \frac{w^2 M^2}{R_L + jwL_s - j/wC}$$
$$= jwL_p + \frac{w^2 M^2}{R_L + j(wL_s - 1/wC)}$$

Let $k$, a quantity less than unity, represent the coupling-coefficient between the primary inductance-portion $L_p$ and the complete secondary inductance $L_s$. Then (2) $$M = k\sqrt{L_p L_s}$$

Substituting this value in Equation 1, we find the input-impedance of the network of Fig. 3 to be, (3) $$Z_i = jwL_p + \frac{k^2 w^2 L_p L_s}{R_L + j(wL_s - 1/wC)}$$

whence the ratio of the input-impedance $Z_i$ of the entire network to the magnitude of the primary impedance $wL_p$ of the coupling-transformer is (4) $$\frac{Z_i}{wL_p} = j + \frac{k^2 wL_s}{R_L + j(wL_s - 1/wC)}$$

This equation may be interpreted by Fig. 4, in which a rectangular system of Cartesian coordinates is used to plot the resistance R and the reactance $jX$ of the impedance-ratio $Z_i/wL_p$. In this figure, the semicircle GHPQ represents the locus of the end of the vector $\overline{OP}$ representing the impedance-ratio $Z_i/wL_p$, as the value of the uncanceled secondary-circuit inductance $$(wL_s - 1/wC)$$

varies between a resonance-condition at G, in which the frequency is such as to make the total secondary-circuit inductance $(wL_s - 1/wC)$ equal to zero, and an extremely high-frequency condition at Q, in which the value of the uncanceled secondary-circuit inductance $(wL_s - 1wC)$ approaches $+\infty$. (It will be understood that subresonance frequencies would produce the upper half of the circle GHPQ.) The vertical line $\overline{OQ}$, with a length of one measurement-unit (to whatever scale Fig. 4 is drawn) represents the term $j$ in Equation 4, and the horizontal line $\overline{QG}$, with a length of $k^2 wL_s/R_L$ measurement-units, represents the diameter of the circle GHPQ. The line $\overline{OP}$ represents the value of the impedance-ratio $Z_i/wL_p$ at any higher-than-resonance frequency at which the uncanceled secondary-circuit inductance $(wL_s - 1/wC)$ has any assigned value. It is readily seen, from Fig. 4, that the equation for the line $\overline{OP}$ is (4a)
$$\overline{OP} = \overline{QP} \cos \phi + j(1 + \overline{QP} \sin \phi)$$
$$= j + \frac{k^2 wL_s}{R_L}(\cos \phi + j \sin \phi) \cos \phi$$
$$= j + \frac{k^2 wL_s}{R_L} \cdot \frac{\cos^2 \phi + \sin^2 \phi}{\cos \phi - j \sin \phi} \cdot \cos \phi$$
$$= j + \frac{k^2 wL_s}{R_L - jR_L \tan \phi}$$

where $\phi = \angle PQG$.

Several things are readily seen from Equations 4 and 4a and Fig. 4; namely, that Equation 4a is the same as Equation 4, that the length of the line $\overline{OQ}$ in Fig. 4 represents the value of the primary reactance $wL_p$, which is taken as the measurement-unit for the figure, that the line $\overline{OP}$ in Fig. 4 represents the value of the impedance-ratio $Z_i/wL_p$, or the value of $Z_i$ if $wL_p = 1$ measurement-unit, and that (4b) $$\tan \phi = \frac{1/wC - wL_s}{R_L}$$

where $\phi = \angle PQG$, measured counterclockwise from the diameter $\overline{QG}$.

If the diameter $k^2 wL_s/R_L$ is not less than 2, there is a point (or points) H at which the circle GHPQ touches the R-axis in Fig. 4, and at this point (or points) the impedance-ratio $Z_i/wL_p$ of the network, or $\overline{OH}$ in Fig. 4, is a pure resistance, so that, by a proper choice of the primary reactance $jwL_p$ of the coupling-transformer, the input-impedance $Z_i$ of the network may be made to agree with a desired resistance-value $R_C$ so as to obtain matched-impedance operation.

In practice, however, (and my invention is predicated on this), a perfect match of impedances is not needed, because the lead-in cable $TL_C$ is fairly short, considerably less than one wavelength, so that there is not enough time-delay in this cable to produce appreciable echoes or confused signals if the impedance-mismatch is not too great. Moreover, the lead-in cable-losses are small, so that some increase in these losses may well be tolerated, as a result of a mismatching of impedances. On the other hand, the power-line $TL_L$ is very long, compared to the wavelength corresponding to the carrier-frequency $f$, and hence the attenuation of the carrier-current in the power-line $TL_L$ is quite large, so that there will be no appreciable backward wave in the power-line $TL_L$, and the carrier-current in the power-line $TL$ will be substantially only a forward current-wave $i$, as shown in Fig. 3, even though there is considerable mismatching of impedances in the coupling-network.

Any mismatching of the load-impedance $Z_1$ which terminates the lead-in transmission-line or cable $TL_C$, will result in a reflected, or backwardly traveling, standing-wave, and in a certain ratio between the voltage-magnitudes $E_B/E_F$, of the backward and forward standing-waves in the lead-in cable. This ratio, $E_B/E_F$, will always be less than unity. We will call it $b$. The currents accompanying these waves are $$I_B = E_B/(-R_C)$$

and $I_F = E_F/R_C$. If the cable is sufficiently short, and if the total resultant currents and voltages at any given point in the cable are designated $I$ and $V$, respectively, it may be considered that the following relationships exist, as shown in Figs. 5 and 6:

(5a)  $E_B = bE_F \angle \theta$
(5b)  $I_B = bI_F \angle (-\theta)$
(5c)  $V = E_F(1 + b \cos \theta + jb \sin \theta)$
(5d)  $I = I_F(1 - b \cos \theta - jb \sin \theta)$ The apparent impedance $Z_a$ of the lead-in cable $TL_C$, at any point where a phase-angle $\theta$ exists between the backward-wave voltage $E_B$ and the forward-wave voltage $E_F$, is therefore the ratio of voltage to current at that point, or (5e) $$Z_a = \frac{V}{I} = \frac{E_F}{I_F} \cdot \frac{(1 + b \cos \theta) + jb \sin \theta}{(1 - b \cos \theta) - jb \sin \theta}$$

(5f) $$= R_C \frac{1 - b^2 \cos^2 \theta - b^2 \sin^2 \theta + j2b \sin \theta}{1 - 2b \cos \theta + b^2 \cos^2 \theta + b^2 \sin^2 \theta}$$

whence $$\frac{Z_a}{R_C} = \frac{1 - b^2 + j2b \sin \theta}{1 + b^2 - 2b \cos \theta}$$

The equation for the locus of the end of a vector $\overline{OP}$, which represents the impedance-ratio $Z_a/R_C$ for an unmatched-coupled cable $TL_C$, having a reflected wave $E_B$ having a magnitude $bE_F$ and leading $E_F$ by the angle $\theta$, as $\theta$ is varied from 0° to 360°, is obtained from Equation 5f. It is, (5g) $$\frac{Z_a}{R_C} = R + jX = \frac{(1 - b^2) + j2b \sin \theta}{1 + b^2 - 2b \cos \theta}$$

where (5h) $$R = \frac{1 - b^2}{1 + b^2 - 2b \cos \theta}$$

whence $$\cos \theta = \frac{1 + b^2}{2b} - \frac{1 - b^2}{2bR}$$

(5i) $$X = \frac{2b \sin \theta}{1 + b^2 - 2b \cos \theta}$$

(5j) $$\frac{X}{R} = \frac{2b \sin \theta}{1 - b^2}$$

whence $$\sin \theta = \frac{X}{R} \cdot \frac{1 - b^2}{2b}$$

(5k) $1 = \sin^2 \theta + \cos^2 \theta$ $$= \frac{X^2}{R^2} \cdot \frac{(1-b^2)^2}{4b^2} + \frac{(1+b^2)^2}{4b^2} - \frac{2(1+b^2)(1-b^2)}{4b^2 R} + \frac{(1-b^2)^2}{4b^2 R^2}$$

$$4b^2 R^2 = X^2(1-b^2)^2 + R^2(1+b^2)^2 - 2R(1+b^2)(1-b^2) + (1-b^2)^2$$

$$0 = X^2(1-b^2)^2 + R^2(1-b^2)^2 - 2R(1+b^2)(1-b^2) + (1-b^2)$$

$$0 = X^2 + R^2 - 2R\frac{1+b^2}{1-b^2} + 1$$

$$X^2 + \left(R - \frac{1+b^2}{1-b^2}\right)^2 = \left(\frac{1+b^2}{1-b^2}\right)^2 - 1 = \frac{4b^2}{(1-b^2)^2} = (\text{radius})^2$$

which is a circle, as shown in Fig. 7, having a center $R_0$ at the point $$\left(R = \frac{1+b^2}{1-b^2}, \quad X = 0\right)$$

that is, a center-displacement, (5l) $$R_0 = \overline{OR_0} = \frac{1+b^2}{1-b^2}$$

having a radius, (5m) $$\rho = \frac{2b}{1-b^2}$$

and having R-axis intercepts at (5n) $$R_1 = \overline{OR_1} = \frac{1+b^2}{1-b^2} - \frac{2b}{1-b^2} = \frac{1-b}{1+b} = \text{minimum value}$$

(5o) $$R_2 = \overline{OR_2} = \frac{1+b^2}{1-b^2} + \frac{2b}{1-b^2} = \frac{1+b}{1-b} = \text{maximum value}$$

The geometric mean of these two intercepts is $$\sqrt{\frac{1-b}{1+b} \cdot \frac{1+b}{1-b}} =$$

unity at the scale to which Fig. 7 is plotted, this scale being the value of the characteristic cable-impedance $R_C$, as indicated in the figure.

If the center-displacement $R_0$ is known, the corresponding value of the standing-wave voltage-ratio $b$ is found by solving Equation 5l, whence (5p) $$b = \sqrt{\frac{R_0 - 1}{R_0 + 1}}$$

If the vector which represents the apparent impedance $Z_a$ of the lead-in cable $TL_C$, expressed in terms of the characteristic impedance $R_C$ of said cable, terminates anywhere on the circle $R_1 P_1 R_2$ in Fig. 7, the ratio between the backward-wave voltage $E_B$ and the forward-wave voltage $E_F$ is equal to the value of $b$ for which said circle is drawn. If the end of this vector falls anywhere outside of the circle, said voltage-ratio is more than the value $b$ for which the circle is drawn. If the end of this vector falls anywhere inside of the circle, the voltage-ratio is less than said value of $b$. If the vector terminates on the resistance-axis $\overline{OR}$ at the point $R_C$, where $\overline{OR_C}$ is the measurement-unit on which the circle is constructed, the backward-wave voltage $E_B$ is non-existent, corresponding to $b = 0$, and matched-impedance operation is being obtained.

If the ratio of the backward-wave voltage $E_B$ to the forward-wave voltage $E_F$ has any given value $b$, (which is necessarily less than unity), the cable-losses can readily be calculated or approximated in terms of the matched-impedance cable-loss and the standing-wave voltage-ratio $E_B/E_F = b$. The ratio of the power which is transmitted in the backward direction, divided by the power which is transmitted in the forward direction, is $E_B^2/E_F^2$, or $b^2$. The net transmitted power is the difference between the forwardly transmitted power and the backwardly transmitted power. Hence, in order to transmit one unit of power when there is a backwardly traveling standing-wave of a magnitude $E_B = bE_F$, it is necessary to transmit $1/(1-b^2)$ units of power by the forward wave $E_F$, and $b^2/(1-b^2)$ units of power by the backward wave $E_B$. This makes the net power $1/(1-b^2) - b^2/(1-b^2)$, or unity. At the same time, the losses in the cable are $1/(1-b^2) + b^2/(1-b^2)$, or $(1+b^2)/(1-b^2)$ times (or $R_0$ times) what the losses would have been if no reflection (or backward wave) had existed, that is, $(1+b^2)/(1-b^2)$ times (or $R_0$ times) the cable-losses for unit-power transmission under matched-impedance conditions.

The Equation $5f$ or $5g$, expressing the value of the impedance-ratio $Z_a/R_c$ during unmatched-coupling conditions when there is a reflected wave $E_B$ in the cable, may be rewritten in terms of the circle-radius, $p = 2b/(1-b^2)$, and the center-displacement $R_0 = (1+b^2)/(1-b^2)$, in Fig. 7. From an inspection of this figure, it is evident that the apparent impedance $Z_a$ of the lead-in cable $TL_c$ is determinable from the equation $$(5q) \qquad \frac{Z_a}{R_c} = R_0 + p \cos\theta + jp \sin\theta$$

whence, by a change of scale, that is, by multiplying both sides of the equation by the scale-ratio $R_c/wL_p$, we have $$(5r) \qquad \frac{Z_a}{wL_p} = \frac{R_c}{wL_p}(R_0 + p\cos\theta + jp\sin\theta)$$
$$= R'_0 + p'(\cos\theta + j\sin\theta)$$

where $R_0$ and $p$ have the values stated in Equations $5l$ and $5m$, respectively, and the standing-wave angle $\theta$, defined in Equation $5a$, may have any value from 0° to 360°, depending upon the point in the cable at which the apparent impedance $Z_a$ is determined.

The center-displacement of the rescaled unmatched-coupling circle of Equation $5r$ is $$(5s) \qquad R'_0 = \frac{R_c R_0}{wL_p}$$

and its radius is $$(5t) \qquad p' = \frac{R_c p}{wL_p}$$

At the receiving (or power-delivering) end of the lead-in cable $TL_c$, that is, at the input-terminals 1, 2 of the coupling-network in Fig. 3, the output-voltage and current of the cable are identical to the input-voltage and current of the network, so that, at this particular point, the apparent impedance $Z_a$ of the cable, as defined in Equations $5f$, $5g$, $5q$ and $5r$, is always the same as the input-impedance $Z_i$ of the network, as defined in Equations 1, 3 and 4. At the network-terminals 1, 2, therefore, the operating-point is at the intersection of the network-impedance circle of Fig. 4 and the cable-impedance circle of Fig. 7, provided that the last-named circle is drawn for the proper value of the standing-wave voltage-ratio $$E_B/E_F = b$$

and provided further that it is redrawn to a scale which is $R_c/wL_p$ times the scale shown in Fig. 7, so that the two intersecting circles will both represent $1/wL_p$ times the value of $Z_i = a$, at the intersecting-point P.

In undertaking the design of a coupling-transformer 14 in accordance with the foregoing principles, the designer knows the characteristic cable-impedance $R_c$, the power-line impulse-impedance $R_L$, the coupling-capacitance $C$, and the range of values of the angular-velocity $w = 2\pi f$. Two coupling-transformer constants are to be determined, namely the primary inductance $L_p$, and $k^2$ times the secondary inductance $L_s$, where $k$ is the coupling-coefficient as defined in Equation 2. The transformer will have to have its highest secondary inductance $L_s$ when the carrier-frequency (and hence $w$) is a minimum, and hence the transformer will have to be designed to have enough secondary turns to satisfy the required conditions when $w$ is a minimum, or $w_{min}$; and then one or more intermediate tap-points (if necessary) may be provided for satisfying the operating-conditions for larger angular velocities $w$.

A little reflection will also show, (and my invention is also predicated on this), that the designer will also know that, if the maximum number of secondary turns, or the maximum secondary inductance $L_{s\,max}$, is to suffice for a certain frequency-range including other frequencies which are larger than the minimum carrier-frequency $f_{min}$, the uncanceled or effective total secondary-circuit inductance $(wL_{s\,max} - 1/wC)$ will become more inductive, and less capacitive, as the frequency increases. Hence, as the frequency increases, the operating-conditions will change from a resonance-condition (such as the point G in Fig. 4), wherein $$(6) \qquad w_{min}L_{s\,max} = 1/w_{min}C$$

or $$w_{min}^2 CL_{s\,max} = 1$$

to a higher-than resonance condition (such as the point P in Fig. 4), wherein $$(6a) \qquad w^2 L_{s\,max} > 1$$

Or the secondary-circuit conditions may even change from a sub-resonance condition (corresponding to a point in the upper half of the circle, above the point G), wherein $$(6b) \qquad w_{min}^2 CL_{s\,max} < 1$$

for example when $$(6b') \qquad w_{min}^2 CL_{s\,max} = 0.8$$

or $$L_{s\,max} = \frac{0.8}{w_{min}^2 C}$$

to a resonance-condition (at G) or even to a super-resonance condition (at P in Fig. 4). In some few cases, the total uncanceled secondary-circuit inductance $(wL_{s\,max} - 1/wC)$ may start with a super-resonance condition, in which the operating-point P will be below the point G in Fig. 4, but generally not enough below G to be as low as the pure-resistance axis $\overline{OR}$ in Fig. 4, and in this case, $$(6c) \qquad w_{min}^2 CL_{s\,max} > 1$$

and the operating-condition will change, with increasing angular velocities $w$, to an operating-condition which is still higher than resonance (still further below the point G on the circle in Fig. 4).

For an initial design-assumption, in showing the design-calculations for a first exemplary form of my present invention, I will assume, by way of illustration, that the operating-point P in Fig. 4, at the minimum frequency and the maximum secondary inductance, is above the point G in Fig. 4, and specifically that it satisfies (for example) Equation 6b′. This fixes the value of the full-turn (or maximum) secondary inductance $L_{s\,max}$ of the transformer, as will be subsequently explained.

The designer may next consider the range of desirable values of the standing-wave voltage-ratio $E_B/E_F = b$, and its effect upon the size and the displacement of the rescaled minimum-frequency unmatched-coupling circle which represents all possible values of the cable-impedance ratio $Z_a/W_{min}L_p$ in Equation 5r. The maximum tolerable value of the reflected wave, $E_B = bE_F$, during unmatched-impedance operation, is controlled by the amount of cable-losses which are to be accepted.

I have already shown, in the discussion following Equation 5p, that the cable-losses, with unmatched coupling, are $R_0$ times the cable-losses with matched-impedance coupling, where $R_0$ is the circle-center displacement $\overline{OR_0}$ in Fig. 7, having a value of $R_0 = (1+b^2)/(1-b^2)$, as stated in Equation 5l. In high-frequency transmission-line calculations, however, it is more convenient to consider the losses in terms of logarithms, measuring the power-loss in nepers, bels, decibels, or the like.

The output-power which is delivered by the cable $TL_c$ to the input-terminals $1$, $2$ of the coupling-network in Fig. 3 is $$(7) \quad P_0 = \frac{E_F^2}{R_C} - \frac{E_B^2}{R_C} = (1-b^2)\frac{E_F^2}{R_C}$$

The input-power which is delivered by the carrier-current source E to the cable-impedance $R_C$ in Fig. 3 is $$(7a) \quad P_i = \frac{E_F^2 e^{2a}}{R_C} - \frac{E_B^2 e^{-2a}}{R_C} = e^{2a}(1-b^2 e^{-4a})\frac{E_F^2}{R_C}$$

where $a$ is the attenuation-constant, and $e$ is the base of the naperian logarithms.

The power-ratio is $$(7b) \quad \frac{P_i}{P_0} = \frac{e^{2a}(1-b^2 e^{-4a})}{1-b^2}$$

which reduces to $P_i/P_0 = e^{2a}$ when $b=0$, that is, for matched-impedance coupling when there is no reflected wave $E_B = bE_F$.

Equation 7b shows that the power-loss in the cable, when there is no reflected wave $E_B$, that is, when $b=0$, is $a$ nepers, or $8.686\,a$ decibels.

When there is a reflected wave of a magnitude $E_B = bE_F$, Equation 7b shows that the loss in the cable is $$a + \tfrac{1}{2}\log_e\left(\frac{1-b^2 e^{-4a}}{1-b^2}\right)$$

nepers, or $$10\log_{10}\left(\frac{P_i}{P_0}\right)$$

decibels.

Most lead-in cables, such as $TL_c$, for carrier-current use, have a loss which is never more than 1 decibel during any conditions of matched-impedance operation. If we make the pessimistic assumption, therefore, that the loss in the cable is 1 decibel, with matched-impedance coupling to the power-line $TL_L$, that is, with $b=0$, Equation 7b shows that this assumption means that $$(8) \quad e^{2a} = 10^{0.1} = 1.2589$$

and $$(8a) \quad e^{-4a} = 10^{-0.2} = 0.6310$$

Then, when there is a reflected wave $E_B = bE_F$, the power-ratio in the cable, as expressed in Equation 7b, becomes $$(8b) \quad \frac{P_i}{P_0} = \frac{1.2589(1-0.631 b^2)}{1-b^2} = \frac{1.2589 - 0.7944 b^2}{1-b^2}$$
$$= \text{antilog}\frac{\text{db loss}}{10}$$

whence $$(8c) \quad b = \sqrt{\frac{P_i/P_0 - 1.2589}{P_i/P_0 - 0.7944}}$$

Table I shows the effect of the standing-wave voltage-ratio $E_B/E_F = b$, on (I) the power-ratio $P_i/P_0$ in the cable, as expressed in Equation 8b; (II) the decibel-loss, which is $10\log_{10}(P_i/P_0)$; (III) the first circle-intercept $R_1 = (1-b)/(1+b)$ in Fig. 7; (IV) the circle-center displacement $R_0 = (1+b^2)/(1-b^2)$, which is also the ratio of the watts-loss in the cable, with and without a reflected wave $E_B = bE_F$; and (V) the circle-radius $p = 2b/(1-b^2)$ in Fig. 7.

TABLE I (For Fig. 7)

| $\frac{E_B}{E_F}=b$ | I $\frac{P_i}{P_0}$ | II Decibel-loss $=10\log_{10}\frac{P_i}{P_0}$ | III $R_1=\frac{1-b}{1+b}$ | IV $R_0=\frac{1+b^2}{1-b^2}$ | V $p=\frac{2b}{1-b^2}$ |
|---|---|---|---|---|---|
| 0 | 1.259 | 1 | 1 | 1 | 0 |
| 0.25 | 1.290 | 1.1055 | .6 | 1.133 | .533 |
| 0.5 | 1.414 | 1.5037 | .333 | 1.667 | 1.333 |
| 0.54 | 1.450 | 1.6141 | .299 | 1.823 | 1.525 |
| 0.55 | 1.460 | 1.6446 | .290 | 1.876 | 1.577 |
| 0.56 | 1.471 | 1.6766 | .282 | 1.914 | 1.632 |
| 0.57 | 1.482 | 1.7098 | .274 | 1.963 | 1.682 |
| 0.58 | 1.494 | 1.7447 | .266 | 2.014 | 1.748 |
| 0.59 | 1.507 | 1.7811 | .258 | 2.068 | 1.810 |
| 0.6 | 1.520 | 1.8189 | .25 | 2.125 | 1.875 |
| 0.7 | 1.705 | 2.3175 | .176 | 2.922 | 2.745 |
| 0.8 | 2.085 | 3.1905 | .111 | 4.556 | 4.444 |
| 0.9 | 3.239 | 5.104 | .053 | 9.526 | 9.474 |
| 0.95 | 5.556 | 7.45 | .026 | 19.51 | 19.48 |
| 1 | ∞ | ∞ | 0 | ∞ | ∞ |

Table I shows that, as the voltage-ratio $E_B/E_F = b$ increases, (as a result of a progressive departure from matched-impedance coupling), the watts-loss in the cable becomes a larger and larger number of times the matched-coupling value of this loss, as shown by column IV which lists the loss-ratio $R_0$. In terms of decibels, as shown in column II, the increased loss is not very high, so that, if the matched-coupling loss is less than 1 decibel (db), the unmatched-coupling loss will be less than 1.5 db when $E_B/E_F$ is 0.5, less than 1.8 db when $E_B/E_F$ is 0.6, and less than 3.2 db when $E_B/E_F$ is as high as 0.8. All of these decibel-losses are, in general, quite acceptable, particularly the range between 1.5 and 1.8 decibels, or lower.

Table I also shows that, as the standing-wave voltage-ratio $E_B/E_F = b$ increases, (as a result of a progressive departure from matched-impedance coupling), the circle in Fig. 7 comes closer and closer to the reactance-axis (as shown by the decreasing values of the intercept $R_1$), and at the same time it changes its shape, because the radius $p$ of the circle becomes larger and larger. In order to determine the effect of the standing-wave voltage-ratio $E_B/E_F$ upon the transformer-design for a given ratio $b$ at any given frequency such as $f_{min}$, it is to be noted that this Fig. 7 circle (when redrawn to a scale which is $Rc/w_{min}L_p$ times the Fig. 7 scale), determines the operating-condition of the coupling-network, by intersecting with the circle which is shown in Fig. 4. Since the redrawn and rescaled Fig. 7 circle, plotting $Z_a/w_{min}L_p$, becomes flatter and flatter, that is, has larger and larger radii, with increasing values of $b$, while at the same time approaching closer and closer to the reactance-axis, it is obvious that, with increasing values of $b$, if the Fig. 4 operating-point P is to be kept on this circle, the scale-multiplying ratio $Rc/w_{min}L_p$ will have to be simultaneously increased—that is, the primary reactance $L_p$ will have to be simultaneously decreased. Hence the transformer-ratio $L_{s\,max}/L_p$ will have to be increased, simultaneously with the increasing values of the standing-wave voltage-ratio $b=E_B/E_F$, in order to cause the (rescaled) Fig. 7 circle to intersect the Fig. 4 circle at some desired operating-point, such as somewhere near the resonance-point G on Fig. 4, which is somewhere near the desirable minimum-frequency operating-point, as explained in connection with Equations 6 to 6c.

As a result of these considerations, the designer will first fix the maximum standing-wave voltage-ratio $E_B/E_F=b$ which is to be deemed acceptable at the lower end of the frequency-range which is to be served by the highest-turn tap 24 on the secondary winding $L_s$ of the coupling-transformer 14. In general, $b$ may be anywhere between 0.5 and 0.6, or $b$ may even have a material value (not zero) which is below 0.5, or $b$ may even, at times, have a value which is somewhat above 0.6, depending upon the extra decibel-losses which are to be accepted, not only in the cable TL$_c$, but also in the coupling-transformer 14. This determines the dimensions of the Fig. 7 circle, particularly the values of the center-displacement $R_0=(1+b^2)/(1-b^2)$ and the radius $p=2b/(1-b^2)$, as computed in Table I.

As previously mentioned, in connection with Equations 6 to 6c, the designer will also have to make a preliminary guess or estimate as to the position of the minimum-frequency operating-point P on the Fig. 4 circle. In other words, the initial value of the angle $\phi$ in Fig. 4 will have to be estimated. This angle is determined by the maximum (or full-turns) value of the secondary inductance $L_{s\,max}$. It is $$(4b') \quad \phi=\tan^{-1}\left(\frac{1/w_{min}C-w_{min}L_{s\,max}}{R_L}\right)$$

As has already been pointed out, in connection with Equations 6 to 6c, this angle $\phi$ should be somewhere near zero; say $$\pm \tan^{-1}(0\pm 0.2)wL_{s\,max}/R_L$$

When $\phi=\tan^{-1}(0)=0°$, we have the condition for resonance in the secondary circuit of the transformer 14. It is to be understood, however, that the angle $\phi$ may depart from the zero value, either above or below the circle-diameter $$\overline{QG}=k^2w_{min}L_{s\,max}/R_L$$

in Fig. 4. In general, in the more conservative designs, the value of the maximum secondary inductance $w_{min}L_{s\,max}$ should be so chosen, with respect to the capacitor-reactance $1/w_{min}C$, at the minimum frequency $f_{min}$ or the minimum angular velocity $w_{min}=2\pi f_{min}$, that $$(9) \quad w_{min}L_{s\,max}=\frac{1\pm 0.2}{w_{min}C}$$

or a little more, or a little less, or anywhere in between these values.

Equation 9 thus determines the value of the maximum secondary inductance, and that, in turn, determines the value of the Fig. 4 angle, which is $$(9a) \quad \phi=\angle PQG=\tan^{-1}\left(\frac{1/w_{min}C-w_{min}L_{s\,max}}{R_L}\right)$$

counting $\phi$ positive when measured above the diameter shown at $$(9b) \quad \overline{QG}=\frac{k^2w_{min}L_{s\,max}}{R_L}$$

It is best, at this point, for the designer to make a preliminary guess, or estimate, as to the probable value of the coupling-coefficient $k$ of the particular kind of transformer which he has in mind, based upon his experience in designing that kind of transformer. This tentatively fixes the length of the circle-diameter in Fig. 4, according to Equation 9b. Then, after the transformer has been completely calculated, if the final results do not agree with the assumed value of $k$, this value will have to be corrected, and the calculations will have to be computed again, until the desired degree of accuracy is obtained. In general, a high degree of accuracy is not necessary.

The co-ordinates of the operating-point P in Fig. 4 are apparent from the figure, and also from Equation 4a. These co-ordinates are, $$(9c) \quad R_P=\overline{QP}\cos\phi=\overline{QG}\cos^2\phi$$
$$X_P=1+\overline{QP}\sin\phi=1+\overline{QG}\sin\phi\cos\phi$$

whence $$(9d) \quad \frac{X_P}{R_P}=\frac{1+\tan^2\phi}{\overline{QG}}+\tan\phi$$

If a graphic solution is to be sought, the designer will next want to plot Equation 5r on the same drawing which shows the operating-point P having the co-ordinates $(R_P, X_P)$. To this end, the designer will have to redraw Fig. 7 for whatever value of $b$ he has chosen, (Fig. 7 was drawn for $b=0.5$); and the designer will also have to rescale Fig. 7 in the scale-ratio $Rc/w_{min}L_p$, (so as to plot $Z_a/w_{min}L_p$, as in Fig. 4 remembering that $Z_i=Z_a$ at the cable-terminal 1, 2).

If the operating-point P, having the coordinates $(R_P, X_P)$, is to lie on this redrawn and rescaled Fig. 7 circle, representing Equation 5r, the distance of the operating-point P from the circle-center $R_0'$, Equation 5s, will have to be equal to the circle-radius $p'$, Equation 5t; thus, $$(9e) \quad \overline{PR_0'}=\sqrt{(R_0'-R_P)^2+X_P^2}=p'$$

if the point P of the Fig. 4 circle is to be on the redrawn and rescaled Fig. 7 circle.

Substituting from Equations 5s and 5t in Equation 9e, and noting that $(R^2_0-p^2)=1$, from Equations 5l and 5m, we have the following conditions for placing the operating-point P on any particular unmatched-coupling circle having a radius $p'=Rcp/w_{min}L_p$:

$$(9f) \quad \frac{R_c^2R_0^2}{w_{min}^2L_p^2}-\frac{2R_cR_0R_P}{w_{min}L_p}+R_P^2+X_P^2=\frac{R_c^2p^2}{w_{min}^2L_p^2}$$

or $$(9g) \quad (R^2_P+X^2_P)w^2_{min}L^2_p-2R_cR_0R_Pw_{min}L_p+R^2_c=0$$

From Equation 9g, we may determine the primary inductance which is necessary to fit the redrawn and rescaled Fig. 7 circle, for unmatched-coupling conditions, that is, for any given standing-wave voltage-ratio $b$, so that this redrawn and rescaled circle will pass through any particular operating-point P, having the co-ordinates ($R_P$, $X_P$). This value of the primary inductance is (9h)
$$L_p = \frac{R_C R_0 R_P \pm \sqrt{R_C^2 R_0^2 R_P^2 - R_C^2(R_P^2 + X_P^2)}}{(R_P^2 + X_P^2) w_{min}}$$
$$= \frac{R_C R_0 R_P \pm R_C \sqrt{R_P^2(R_0^2 - 1) - X_P^2}}{(R_P^2 + X_P^2) w_{min}}$$

If the primary inductance $L_p$ is known, (or is to be varied), Equation 9g can be rearranged to show the circle-center displacement $R_0$ of the original Fig. 7 circle, which is required to make the rescaled circle of Equation 5r pass through the point ($R_P$, $X_P$). Thus, (9i) 
$$R_0 = \frac{(R_P^2 + X_P^2) w_{min}^2 L_p^2 + R_C^2}{2 R_C R_P w_{min} L_p}$$

Equation 9h determines the values of the two primary inductances $L_p$, either one of which will produce the given standing-wave voltage-ratio $b$, provided that $R_P$, $X_P$ and $R_C$ are known.

From Equation 9h, since the quantity under the radical may not be negative, it is evident, in practicing my invention, that (9j) $\qquad X_P \geqslant R_P \sqrt{R_0^2 - 1}$ or $$R_0^2 \leqslant \frac{X_P^2}{R_P^2} + 1$$

or $$R_0^2 \leqslant \left( \frac{1 + \tan^2 \phi}{QG} + \tan \phi \right)^2 + 1$$

the last substitution being made from Equation 9d. Equation 9j states that the initial (or minimum-frequency) operating-point P in Fig. 4 may not be made too high, in consideration of the loss-multiplying ratio $R_0$, which is also the circle-center displacement in Fig. 7; and neither can the center-displacement $R_0$ be made too small, in consideration of tan $\phi$ as defined in Equation 4b or 4b'.

The foregoing equations and design-procedures are perfectly general, applicable to both iron-core and air-core transformers, of whatever values of coupling-coefficients $k$. If the transformer is an iron-core transformer, it must have extremely thin laminations for the core, or else a powdered core, in accordance with usual high-frequency practice.

By way of illustration, I will apply these design-principles to the design of a concentric-coil air-core transformer, which is a convenient type of coupling-transformer, the top half of which is shown in diagrammatic section (but not to scale) in Fig. 8. It may be either a two-winding transformer or an autotransformer. It is illustrated in Fig. 8, (as well as in the equivalent-circuit diagram of Fig. 2), as an autotransformer, consisting of an inner coil or winding, designated by the same reference-character as its self-inductance $L_p$, surrounded by an outer or overlying coil or winding, designated by the same reference-character as its self-inductance $L_2$. The mutual inductance between these two windings $P_p$ and $L_2$ is designated $M_{p2}$. The inner winding $L_p$ constitutes the primary turns $n$, which are also a part of the secondary turns $N_s = n + N$, while the outer winding $L_2$ constitutes the remainder, $N$, of the secondary turns $N_s$. The winding-turns $N_s = n + N$ are wound in successive layers 40, wound one on top of each other, the inner layer being wound on a cylindrical insulating-mandrel 39. The overall mutual inductance between the primary turns $N_p$ and the secondary turns $N_s$ is designated by M, and has a value equal to

(10) $\qquad M = M_{p2} + L_p$

This coupling-transformer $L_p$, $L_2$ must withstand lightning-surges up to the value of the protective gap 32 in Fig. 1, which is usually under 15 or 20 kilovolts. Hence, I use an additional layer of sheet-insulation $INS_s$, which (for example) may be an acetate sheet having a thickness of .005 inch, between successive layers 40 of the winding $L_p$, $L_2$, in addition to the usual wire-insulation $INS_w$. This layer-insulation $INS_s$ preferably extends some ⅜ inch axially beyond each end of the winding $L_p$, $L_2$, in order to obtain a high creepage-distance insulation, as shown in Fig. 8. This necessity for protecting against lightning-damage results in a transformer having a slightly larger coil-size, and hence a lower coupling-coefficient $k$, than would otherwise be desirable.

Let us assume that the inner coil or primary winding $L_p$ has $n$ turns, and has a mean radius $a$, an axial length $x$, and a radial depth $t$, in inches, as shown in Fig. 8. Let us assume that the outer coil or exclusively secondary portion $L_2$ has N turns, and has a mean radius A, (say) the same axial length $x$, and a radial depth T, in inches, as also shown in Fig. 8. Let us designate the mean radius of the complete secondary winding $L_p$, $L_s$, constituting all of the turns $N_s = n + N$, as $A_s$, as indicated in Fig. 8.

The approximate values of the self-inductances of these coils, using Formula 56 on page 62 of Terman's Radio Engineers' Handbook, are (10a) $\qquad L_p = \frac{0.8 a^2 n^2 \times 10^{-6}}{6a + 9x + 10t}$ henrys (10b) $\qquad L_2 = \frac{0.8 A^2 N^2 \times 10^{-6}}{6A + 9x + 10T}$ henrys (10c) $\qquad L_s = \frac{0.8 A_s^2 N_s^2 \times 10^{-6}}{6 A_s + 9x + 10T_s}$ henrys The approximate value of the coupling-coefficient $k_{p2}$ between the two coils $L_p$ and $L_2$, using Terman's formula 87 on page 71, is (10d) $\qquad k_{p2} = \frac{a^2}{A^2}$ Two illustrative design-calculations will suffice.

As a first example, let us determine the design-constants for a coupling-transformer for coupling carrier-current of a frequency between 45 and 165 kilocycles (kc.), through a .004 microfarad coupling-capacitor C which is about as large as any that would normally be encountered in practice.

Thus, let us assume:

(11)

$f_{min} = 45,000$ cycles per second = minimum frequency $f_{max} = 165,000$ cycles per second = maximum frequency $w_{min} = 2\pi \times 45,000 = .28274 \times 10^6$ radians per second $w_{max} = 2\pi \times 165,000 = 1.0367 \times 10^6$ radians per second $R_C = 50$ ohms $R_L = 450$ ohms $C = .004 \times 10^{-6}$ farad $k = .8$, $k^2 = .64$, when $L_s$ is a maximum.

If we assume a sub-resonance condition at 45 kc., so that some equation such as 6b', for example, is satisfied, then, with that assumption, the maximum (or full-turn) secondary inductance will be (11a)
$$L_{s\ max} = \frac{0.8}{w_{min}^2 C} = \frac{0.8 \times 10^{-6}}{.28274^2 \times .004} = 2502 \times 10^{-6}$$

henrys.

From Equation 4b or Equation 9a, the angle $\phi$ in Fig. 4 is (11b)
$$\phi = \tan^{-1}\left(\frac{1/w_{min}C - w_{min}L_{s\ max}}{R_L}\right)$$
$$= \tan^{-1}\left[\frac{(1/.28274 \times .004) - (.28274 \times 2502)}{450}\right]$$
$$= \tan^{-1}(1.9649 - 1.5721) = \tan^{-1} 0.3928$$
$$= 21°27'$$

The positive sign indicates that the angle $PQG = \phi$ is measured above the diameter $\overline{QG}$, which agrees with our assumption of a sub-resonance condition, with the frequency not high enough to make the secondary inductance $w_{min}L_{s\ max}$ numerically equal to the coupling-capacitance $1/w_{min}C$.

The Fig. 4 circle would have to be redrawn, therefore, to satisfy Equations 4b and 9a for a minimum frequency and maximum secondary turns. The distance, $\overline{OQ} = 1$, would be set off on the vertical (or reactance) axis, and the horizontal diameter would be measured off to be (11c)
$$\overline{QG} = \frac{k^2 w_{min} L_{s\ max}}{R_L} = \frac{.64 \times .28274 \times 2502}{450} = 1.0061$$

while the angle GQP would be $\phi = +21°27'$ (the plus sign indicating that the angle is measured above the diameter $\overline{QG}$.)

The co-ordinates of the operating-point P in this redrawn Fig. 4 would be determined by Equations 9c, namely (11d)
$$R_P = \overline{QP} \cos \phi = \overline{QG} \cos^2 \phi = 1.0061 \cos^2 21°27'$$
$$= 0.8716$$

$$X_P = 1 + \overline{QP} \sin \phi = 1 + \overline{QG} \sin 21°27' \cos 21°27'$$
$$= 1.3424$$

Let us now assume, by way of giving a concrete illustration, that we can accept a possible maximum decibel-loss of 1.67 in the cable. Reference to Table I, or use of Equations 8b, 8c, and 5l, shows that a loss of 1.67 decibels corresponds to a standing-wave voltage-ratio of approximately $b = 0.56$, and a Fig. 7 center-displacement of approximately $R_0 = 1.91$. This enables us to calculate the required primary inductance $L_p$ from Equation 9h. Thus (11e)
$$L_p = \frac{R_C R_0 R_P \pm R_C \sqrt{R_P^2(R_0^2 - 1) - X_P^2}}{(R_P^2 + X_P^2) w_{min}}$$
$$= \frac{50 \times 1.91 \times 0.8716 \pm 50\sqrt{0.7597 \times (3.648 - 1) - 1.8020}}{(0.7597 + 1.8020) \times .28274 \times 10^6}$$
$$= \frac{82.24 \pm 22.91}{2.5617 \times .28274 \times 10^6} = 147 \times 10^{-6}$$

or $83 \times 10^{-6}$

Equations 11, 11a and 11e thus define the required transformer as having a coupling-coefficient $k = 0.8$, an overall secondary inductance $L_s\ max = 2502 \times 10^{-6}$ henrys, and a primary inductance $L_p$ = either $83 \times 10^{-6}$ or $147 \times 10^{-6}$ henrys.

These conditions can be satisfied in transformers of a variety of different lengths, radii, coil-thicknesses, and core-materials. Using the type of transformer shown in Fig. 8, and choosing a mandrel 39 of a convenient outer diameter, of say 1.875 inches, we might, as a first trial, try using eight layers 40, each layer containing 30 turns of No. 20 dcc. wire, having a wire-diameter which we will assume to be .032 inch bare, plus wire-insulation $INS_w$ having a thickness which we will assume to be .005 inch, making a total outside wire-diameter of .042 inch. Let us further try making the inner coil $L_p$ consist of 2 complete layers, while the outer coil $L_2$ consists of 6 complete layers, using whole numbers of layers for convenience in bringing out the taps and maintaining the insulation. Then, if the sheet-insulation $INS_s$ between successive layers 40 has a thickness of .005 inch, as assumed in Fig. 8, we will have the following transformer-dimensions:

(11f)
$$a = \frac{1.875}{2} + .042 + \frac{.005}{2} = .982 \text{ inch},\ a^2 = .9643$$
$$A_s = a + 3 \times .047 = 1.123 \text{ inch},\ A_s^2 = 1.2611$$
$$A = a + 4 \times .047 = 1.17 \text{ inch},\ A^2 = 1.3689$$
$$x = 30 \times .042 - 2 \times .005 = 1.25 \text{ inch}$$
$$t = 2 \times .032 + 3 \times .005 = 0.079 \text{ inch}$$
$$T_s = 8 \times .032 + 7 \times .015 = 0.361 \text{ inch}$$
$$T = 6 \times .032 + 5 \times .015 = 0.267 \text{ inch}$$
$$n = 2 \times 30 = 60 \text{ turns},\ n^2 = 3600$$
$$N_s = 8 \times 30 = 240 \text{ turns},\ N_s^2 = 57,600$$
$$N = 6 \times 30 = 180 \text{ turns},\ N^2 = 32,400$$

The performance-characteristics of such a transformer, as determined by Equation 2 and Equations 10 to 10d, are as follows:

(11g)
$$L_p = \frac{0.8 \times .9643 \times 3600 \times 10^{-6}}{(5.892 + 11.25 + 0.79 = 17.932)} = 155 \times 10^{-6} \text{ henrys}$$

$$L_2 = \frac{0.8 \times 1.3689 \times 32,400 \times 10^{-6}}{(7.02 + 11.25 + 2.67 = 20.94)} = 1694 \times 10^{-6} \text{ henrys}$$

$$L_s = \frac{0.8 \times 1.2611 \times 57,600 \times 10^{-6}}{(6.738 + 11.25 + 3.61 = 21.60)} = 2690 \times 10^{-6} \text{ henrys}$$

$$k_{p2} = \frac{0.9643}{1.3689} = .7044$$

$$M_{p2} = k_{p2}\sqrt{L_p L_2} = 361 \times 10^{-6} \text{ henrys}$$

$$M = M_{p2} + L_p = 516 \times 10^{-6} \text{ henrys}$$

$$k = \frac{M}{\sqrt{L_p L_s}} = .7994$$

$$k^2 = .6390$$

It will be noted that the actual primary inductance, $L_p = 155 \times 10^{-6}$, agrees reasonably well with the value, $L_p = 147 \times 10^{-6}$, which was calculated in Equation 11e; and that the actual overall secondary inductance, $L_s = 2690 \times 10^{-6}$, agrees reasonably well with the value, $$L_{s\ max} = 2502 \times 10^{-6}$$

which was calculated in Equation 11a; while the actual coupling-coefficient, $k = .7994$, agrees sufficiently closely with the originally assumed value, $k = .8$, in Equation 11, so that a recalculation is not necessary.

For this transformer as defined in Equation 11g, and for the initially assumed system-constants as stated in Equation 11, (6b'')
$$w_{min}^2 CL_s = .079943 \times .004 \times 2690 = 0.8602$$

the angle PQG is (11b')
$$\phi = \tan^{-1}\left[\frac{(1/.28274 \times .004) - (.28274 \times 2690)}{450}\right]$$
$$= \tan^{-1}(1.9649 - 1.6902) = \tan^{-1} 0.2747$$
$$= 15°22'$$

the diameter of the Fig. 4 circle is (11c')
$$\overline{QG} = \frac{.639 \times .28274 \times 2690}{450} = .639 \times 1.6902 = 1.080$$

the coordinates of the operating-point P are (11d')
$$R_P = \overline{QG} \cos^2 \phi = 1.08 \cos^2 15°22' = 1.004$$
$$X_P = 1 + 1.08 \cos 15°22' \sin 15°22' = 1.276$$

the center-displacement of the Fig. 7 circle is (9i')
$$R_0 = \frac{(R_P{}^2 + X_P{}^2)w_{min}^2 L_p{}^2 + R_C{}^2}{2R_C R_P w_{min} L_p}$$
$$= \frac{(1.008 + 1.628) \times .28274^2 \times 155^2 + 50^2}{2 \times 50 \times 1.004 \times .28274 \times 155} = 1.719$$

the standing-wave voltage-ratio is better than the originally assumed value, $b = 0.56$, being actually (5p')
$$b = \sqrt{\frac{R_0 - 1}{R_0 + 1}} = \sqrt{\frac{0.719}{2.719}} = 0.5142$$

the power-ratio of the cable $TL_c$ is (8b')
$$\frac{P_i}{P_0} = \frac{1.2589 - 0.7944 b^2}{1 - b^2} = \frac{1.2589 - 0.7944 \times 0.2644}{0.7356}$$
$$= 1.426$$

the decibel-loss is $10 \log_{10} (1.426) = 1.54$, the first intercept in Fig. 7 is (5n')
$$R_1 = \frac{1-b}{1+b} = \frac{0.4858}{1.5142} = 0.321$$

and the circle-radius in Fig. 7 is (5m')
$$p = \frac{2b}{1-b^2} = \frac{2 \times .5142}{0.7356} = 1.398$$

The resulting circles, drawn to any convenient common scale, are shown in Fig. 9, wherein the circle 41 is the circle of Fig. 4, drawn on a horizontal diameter $\overline{QG} = 1.08$, as shown in Equation 11c'; while the vertical line $\overline{OQ}$ is equal to unity, as shown as $j$ in Equation 4; and the angle $PQG = \phi = +15°22'$, as shown in Equation 11b'.

In this Fig. 9, the circle 42 represents Equation 5r, wherein the center-displacement, on the R-axis, is (5s')
$$R_0' = \frac{R_C R_0}{w_{min} L_p} = \frac{50 R_0}{.28274 \times 155} = 1.141 R_0$$
$$= 1.141 \times 1.719 = 1.961$$

while the radius of said circle 42 in Fig. 9 is (5t')
$$p' = \frac{R_C p}{w_{min} L_p} = 1.141 p = 1.141 \times 1.398 = 1.595$$

The co-ordinates of the operating-point P in Fig. 9 are (1.004, 1.276), as given in Equation 11d'. If we use the same transformer, with the same numbers of primary and secondary turns, and if we now apply some other carrier-frequency $f_2 = w_2/2\pi$, the diameter $\overline{QG_2}$ of the new circle 41₂ in Fig. 9 becomes (11c'')
$$\overline{QG_2} = \frac{1.08 f_2}{f_{min}}$$

while the angle $P_2QG_2$ becomes (11b'')
$$\phi_2 = \tan^{-1}\left(\frac{1.9649 f_{min}}{f_2} - \frac{1.6902 f_2}{f_{min}}\right)$$

and the co-ordinates of the new operating-point $P_2$ become (11d'')
$$R_{P2} = \overline{QG_2} \cos^2 \phi_2 = \frac{1.08 f_2 \cos^2 \phi_2}{f_{min}}$$
$$X_{P2} = 1 + \frac{1.08 f_2 \cos \phi_2 \sin \phi_2}{f_{min}}$$

If we assume that, when we change the frequency from $f_{min}$ to $f_2$, the value of the standing-wave voltage ratio remains unchanged at $b = 0.5142$, as found in Equation 5p', then Equation 5l will be controlling, in determining the value of the Fig. 7 center-displacement $R_0$, and Equation 9i will not apply, because the new rescaled Fig. 9 circle 42₂ no longer (in general) passes through the new operating-point ($R_{P2}$, $X_{P2}$). Equation 5l shows that, if the voltage-ratio $b$ is constant, the Fig. 7 center-displacement $R_0$ remains constant, independent of the frequency $f$ or the angular velocity $w = 2\pi f$, and hence, when we change to a new frequency $f_2$ without changing the backward-to-forward voltage-ratio $b = E_B/E_F$, the Fig. 7 center-displacement $R_0$ remains constant at $R_0 = 1.719$, as determined in Equation 9i'. The new Fig. 9 circle 42₂, however, changes, because the scale-ratio $R_C/w_2 L_p$ changes when the angular velocity changes from $w_{min}$ to $w_2$, so that this new Fig. 9 circle 42₂ will now have a center-displacement (5s'')
$$R_{02}' = \frac{R_C R_0}{w_2 L_p} = \frac{R_0' f_{min}}{f_2} = \frac{1.961 f_{min}}{f_2}$$

and a radius (5t'')
$$p_2' = \frac{R_C p}{w_2 L_p} = \frac{p' f_{min}}{f_2} = \frac{1.595 f_{min}}{f_2}$$

The distance between the new operating-point $P_2$ and the new circle-center $R_{02}'$ at any frequency $f_2$ is (11h)
$$\overline{P_2 R_{02}'} = \sqrt{(R_{02}' - R_{P2})^2 + X_{P2}^2}$$

If the losses are to be kept as low as at the minimum frequency $f_{min}$, the distance $\overline{P_2 R_{02}'}$ of Equation 11h must not be greater than the circle-radius $p_2'$ of Equation 5t'', at each value of the frequency $f_2$. This problem can best be solved empirically or graphically, as shown in Table II, which shows the following data for each of a plurality of different assumed frequencies $f_2$; namely, the input-impedance circle-diameter $\overline{QG_2}$ of the circle 41₂ in Fig. 9 according to Equation 11c'', the angle $\phi_2$ according to Equation 11b'', the coordinates ($R_{P2}$, $X_{P2}$) of the operating-point $P_2$ according to Equation 11d'', the center-displacement $R_{02}'$ of the Fig. 9 apparent-impedance circle 42₂ according to Equation 5s'', and the radius $p_2'$ of the Fig. 9 circle 42₂ according to Equation 5t'', using the proper values of the angular velocity $w$. These quantities are calculated for the conditions, $R_C = 50$, $R_L = 450$, $C = .004 \times 10^{-6}$, $L_s = 2690 \times 10^{-6}$, $L_p = 155 \times 10^{-6}$, $k = 0.7994$, and $b = 0.5142$.

TABLE II (For Fig. 9)

| $f_2$ | $\overline{QG_2}$ | $\phi_2$ | $R_{P2}$ | $X_{P2}$ | $R'_{02}$ | $\overline{P_2R'_{02}}$ | $p'_2$ |
|---|---|---|---|---|---|---|---|
| 45,000 | 1.080 | +15°22' | 1.004 | 1.276 | 1.961 | 1.595 | 1.595 |
| 60,000 | 1.440 | −37°57' | .8954 | .3017 | 1.471 | .939 | 1.196 |
| 75,000 | 1.800 | −58°36' | .4886 | .1995 | 1.177 | .959 | .957 |
| 90,000 | 2.160 | −67°22' | .3199 | .2328 | .9805 | .959 | .7975 |
| 105,000 | 2.520 | −72° 8' | .2372 | .2632 | .840 | .936 | .684 |
| 120,000 | 2.880 | −75° 9' | .1892 | .2865 | .735 | .913 | .598 |
| 135,000 | 3.240 | −77°14' | .1582 | .3017 | .654 | .892 | .532 |
| 150,000 | 3.600 | −78°47' | .1362 | .3131 | .588 | .874 | .4785 |
| 165,000 | 3.960 | −79°59' | .1198 | .3217 | .535 | .860 | .435 |

$R_C = 50, R_L = 450, C = .004 \times 10^{-6}, L_s = 2690 \times 10^{-6}, L_p = 155 \times 10^{-3}, k^2 = .799, b = .514$.

It should be remembered that this Table II is computed for a standing-wave voltage ratio of $E_B/E_F = b = 0.5142$, corresponding to a maximum possible cable-loss of 1.54 db, assuming that the cable-loss under matched-coupling conditions would never be over 1 db. When any operating-point $P_2$ is on the unmatched-coupling circle $42_2$ for that frequency, the decibel-loss and the standing-wave voltage-ratio $b$ have their assumed values of 1.54 and 0.514, respectively. When the operating-point $P_2$ is inside of the corresponding circle $42_2$, the decibel-loss and the voltage-ratio $b$ have values which are smaller than the values for which that circle $42_2$ was drawn. When the distance of the operating-point $P_2$ from the center $R'_{02}$ of the unmatched-coupling circle $42_2$ in Fig. 9, is equal to the circle-radius $p'_2$, the operating-point $P_2$ is obviously on the circle, and when this distance $\overline{P_2R'_{02}}$ is smaller than the radius $p'_2$, the operating-point $P_2$ is obviously inside of the circle.

A comparison of the last two columns of Table II thus shows that the backward-to-forward voltage-ratio $E_B/E_F = b$ has its assumed value of 0.514 when the carrier-frequency is either 45 kilocycles or 75 kilocycles; this $b$-ratio is less than 0.514 at intermediate frequencies; and it is higher than 0.514 when the frequency is less than 45 or more than 75 kilocycles.

To avoid excessive confusion in Fig. 9, the two circles $41_2$ and $42_2$ are drawn for only one additional frequency, namely 60 kilocycles, in addition to the initial circles 41 and 42 for the minimum frequency of 45 kilocycles. It is noted that, as the frequency $f$ increases, the circle $41$, representing the network-impedance $Z_1$ in terms of the primary reactance $wL_p$, will increase in size, having a diameter $\overline{QP}$ equal to $k^2wL_s/R_L$; whereas the other circle, 42, representing the apparent cable-impedance $Z_a$ in terms of the primary reactance $wL_p$, will decrease in size, having a radius $p' = 2bR_C/wL_p(1-b^2)$, and a center-displacement $R'_0 = R_C(1+b^2)/wL_p(1-b^2)$.

The locus of the operating-point P, as the frequency changes, is plotted at $P_f$ in Fig. 9, using the coordinates ($R_P$, $X_P$) of this point, as tabulated in Table II.

Table II thus shows that the maximum-turn secondary-tap or secondary-winding terminal 24 is suitable for a frequency-range between 45 and 75 kilocycles; and that if a somewhat higher decibel-loss were accepted, this tap 24 would be suitable also for still higher frequencies.

To find a smaller-turn secondary-tap 43 which will have a frequency-range overlapping, or nearly overlapping, the frequency-range for this maximum-turn tap, several procedures are available. For example, we might make the lower end of the frequency-range for the proposed tap 43 have a value of 65 kilocycles, so that there would be a 10-kilocycle overlap of the two frequency-ranges, one ending at 75 kilocycles, and the other starting at 65 kilocycles. (This is an arbitrary assumption, as the frequency-overlap may be anything reasonable, or it may even be zero.)

We will then treat the problem as a new transformer-design, starting out with the premise that the operating-point P in the Fig. 4 circle should be somewhere near the end G of the horizontal diameter $\overline{QG}$. For example, in Equations 6 to 6c, or in Equation 9, we might arbitrarily assume that $$(9^3) \qquad w_{3\,min}^2 L_{s3} C = 1$$

very roughly, where $w_{3\,min}$ is the minimum frequency of the tap-43 frequency-range, and $L_{s3}$ is the needed value of the over-all secondary inductance when the tap 43 is used. We have tentatively assumed that $$w_{3\,min} = 2\pi \times 65,000 = 0.4084 \times 10^6$$

Sometimes, several trials will be needed, to determine a suitable value of $w_{3\,min}$ and a suitable approximation to unity in Equation 9 or $9^3$, so as to be able to place the secondary tap 43 at the end of one of the secondary layers 40 (for convenience in design and insulation, and so as to obtain a suitable upper limit, $w_{3\,max}$, of the frequency-range for this tap 43).

Thus, in Equation $9^3$, if we put $$w_{3min} = 0.4084 \times 10^{-6}$$

and $$C = 0.004 \times 10^{-6}$$

as in Equation 11, we find that the secondary inductance $L_{s3}$, when using the tap 43, should be roughly about $1500 \times 10^{-6}$ henrys. We have already found that the full-turn secondary terminal, using all eight secondary layers 40, gave a secondary inductance of $L_{s\,max} = 2690 \times 10^{-6}$ henrys. Equation 10c will show that, in order to obtain an inductance of $1500/2690 = 0.56$ times as much as the 8-layer inductance, while at the same time having a somewhat smaller coil-radius $A_{s3}$ and a smaller coil-thickness or radial depth $T_{s3}$, would require a turn-ratio, squared $$N_{s3}^2/N_{s\,max}^2$$

of the order of, say, 0.55, instead of 0.56, thus yielding $N_{s3}/N_{s\,max}$ approximately 0.74, say 0.75, which would indicate a 6-turn secondary winding.

If now, we put the secondary tap 43 at the end of the sixth layer of the transformer identified in Equations 11f, the transformer-dimensions will be as follows:

(12)

$a = .982, a^2 = .9643$ $A_{s3} = A_s − .047 = 1.123 − 0.047 = 1.076, A_{s3}^2 = 1.1578$ $A_{23} = A_s = 1.123, A_{23}^2 = 1.2611$ $x = 1.25$ $t = 0.079$ $T_{s3} = 6 \times .032 + 5 \times .015 = 0.267$ $T_{23} = 4 \times .032 + 3 \times .015 = 0.173$ $n = 2 \times 30 = 60$ turns, $n^2 = 3600$ $N_{s3} = 6 \times 30 = 180$ turns, $N_{s3}^2 = 32,400$ $N_{23} = 4 \times 30 = 120$ turns, $N_{23}^2 = 14,400$ Instead of the performance-characteristics listed in Equations 11g, we now have, for the secondary tap 43, (12a)

$$L_p = 155 \times 10^{-6} \text{ henrys}$$

$$L_{23} = \frac{0.8 \times 1.2611 \times 14{,}400 \times 10^{-6}}{(6.738 + 11.25 + 1.73 = 19.718)}$$

$$= 737 \times 10^{-6} \text{ henrys}$$

$$L_{s3} = \frac{0.8 \times 1.1578 \times 32{,}400 \times 10^{-6}}{(6.456 + 11.25 + 2.67 = 20.376)}$$

$$= 1473 \times 10^{-6} \text{ henrys}$$

$$k_{p3} = \frac{0.9643}{1.2611} = .76465$$

$$M_{p3} = k_{p3}\sqrt{L_p L_{23}} = 258 \times 10^{-6} \text{ henrys}$$

$$M_{s3} = M_{p3} + L_p = 413 \times 10^{-6} \text{ henrys}$$

$$k_3 = \frac{M_{s3}}{\sqrt{L_p L_{s3}}} = .864$$

$$k_3^2 = .747$$

Fig. 10, plotted to the same scale as Fig. 9, shows the operating-conditions for the transformer-tap 43. The circle 41₆₅, having a diameter (12b)

$$\overline{QG_{65}} = \frac{k_3^2 w_{3\,\text{min}} L_{s3}}{R_L} = \frac{.747 \times .40841 \times 1473}{450} = 0.9987$$

represents the input-impedance $Z_1$ of the network, in terms of the primary inductance $wL_p$, at the minimum tap 43 frequency, $f_{3\,\text{min}} = 65$ kilocycles. At any other tap 3 frequency, $f_3$, the diameter of the new circle 41₃, corresponding to the circle 41₆₅, will be (12b')
$$\overline{QG_3} = \frac{.9987 f_3}{f_{3\,\text{min}}}$$

In Fig. 10, the circle 42₆₅, having a center-displacement (12c)   $$R_{065}' = \frac{R_c R_0}{w_{3\,\text{min}} L_p} = \frac{50 \times 1.719}{.4084 \times 155} = 1.358$$

and a radius (12d)   $$p_{65}' = \frac{R_c p}{w_{3\,\text{min}} L_p} = \frac{50 \times 1.398}{.4084 \times 155} = 1.104$$

represents the apparent cable-impedance $Z_a$, in terms of the primary inductance $wL_p$, at the minimum tap-43 frequency, $f_{3\,\text{min}} = 65$ kilocycles, assuming the same voltage-ratio, $b = 0.5142$, as in Fig 9. At any other tap-3 frequency, $f_3$, still assuming the same voltage-ratio, $b = 0.5142$, the center-displacement becomes (12c')   $$R_{03}' = \frac{R_{065}' f_{3\,\text{min}}}{f_3} = 1.358 \frac{f_{3\,\text{min}}}{f_3}$$

and the circle-radius becomes (12d')   $$p_3' = \frac{p_{65}' f_{3\,\text{min}}}{f_3} = \frac{1.104 f_{3\,\text{min}}}{f_3}$$

Table III, corresponding to Table II for Fig. 9, shows some of the calculations for Fig. 10. Thus, Table III tabulates the input-impedance circle-diameter $\overline{QG_3}$ of the circle 41₃ in Fig. 10, the angle $\phi_3$, the co-ordinates ($R_{P3}$, $X_{P3}$) of the operating-point $P_3$, the center-displacement $R_{03}'$ of the apparent-impedance circle 42₃, the distance $\overline{P_3 R_{03}}$, and the radius $p_3'$ of the circle 42₃ in Fig. 10, for different assumed values of the frequency $f_3$, when $R_C = 50$, $R_L = 450$, $C = .004 \times 10^{-6}$, $L_{s3} = 1473 \times 10^{-6}$, $L_p = 155 \times 10^{-6}$, $k = 0.864$, and $b = 0.5142$.

TABLE III (For Fig. 10)

| $f_3$ | $\overline{QG_3}$ | $\phi_3$ | $R_{P3}$ | $X_{P3}$ | $R_{03}'$ | $\overline{P_3 R_{03}}$ | $p_3'$ |
|---|---|---|---|---|---|---|---|
| 60,000 | .9219 | +13°29' | .8718 | 1.2090 | 1.471 | 1.346 | 1.196 |
| 65,000 | .9987 | + 1°21' | .9982 | 1.0235 | 1.358 | 1.069 | 1.104 |
| 75,000 | 1.1523 | −19°58' | 1.0180 | .6302 | 1.177 | .650 | .957 |
| 90,000 | 1.3828 | −40°58' | .7884 | .3154 | .9805 | .369 | .7975 |
| 105,000 | 1.6133 | −52°48' | .5897 | .2231 | .840 | .335 | .684 |
| 120,000 | 1.8437 | −59°59' | .4614 | .2014 | .735 | .340 | .593 |
| 135,000 | 2.0742 | −64°46' | .3770 | .2001 | .654 | .342 | .532 |
| 150,000 | 2.3047 | −68°10' | .31845 | .20435 | .588 | .336 | .4785 |
| 165,000 | 2.5351 | −70°43' | .2765 | .2098 | .535 | .332 | .435 |

$R_C = 50$, $R_L = 450$, $C = .004 \times 10^{-6}$, $L_s = 1473 \times 10^{-6}$, $L_p = 155 \times 10^{-6}$, $k = .864$, $f = .514$.

The last two columns of Table III show that $\overline{P_3 R_{03}}$ is less than $p'_3$, and hence the standing-wave voltage-ratio $E_B/E_F = b$ is less than the assumed value 0.514, throughout the frequency-range starting slightly below 65 kilocycles and ending considerably above 165 kilocycles.

Thus, it is possible, using only one intermediate secondary tap 43 in addition to the full-turn secondary terminal 24, to couple any carrier-frequency from 45 to 165 kilocycles, and more, without introducing a reflected wave $E_B$ any larger than 0.514 times the forward wave $E_F$, and without encountering a loss of more than 1.54 db in the coupling-cable $TL_C$.

In Fig. 10, one additional pair of circles 41₁₀₅ and 42₁₀₅, are drawn, by way of illustration, for a frequency of 105 kilocycles, in addition to the initial circles 41₆₅ and 42₆₅ for the minimum frequency, 65 kilocycles, for this tap 43.

One more example will suffice, and only the beginnings of the calculation of this second example of coupling-transformer 14 will need to be indicated.

Instead of assuming one of the largest coupling-capacitors, $C$, which is likely to be encountered in practice, as was done in Equation 11, where $C$ was 0.004 microfarad, let us assume one of the smallest likely coupling-capacitors, where

(13)   $$C_4 = 0.0013 \times 10^{-6} \text{ farads}$$

the other line-constants being as stated in Equation 11 (not including the coupling-coefficient $f$ as a line-constant).

Also, by way of example, let us now assume a two-winding coupling-transformer, instead of the single-winding transformer or autotransformer which was shown in Fig. 8.

It is not necessary that the minimum frequency of the carrier-current frequency-band shall be at the extreme lower edge of the frequency-band which is served by the maximum secondary inductance $L_{s\,\text{max}}$, as previously assumed. For example, the lowest carrier-frequency, $f_{\text{min}} = 45{,}000$ cycles, may fall somewhere near the middle of the frequency-band which is acceptable to $L_{s\,\text{max}}$. Thus, we may start out, at the minimum carrier-frequency $f_{\text{min}}$, with a super-resonance condition as expressed in Equation 6c, although we are not limited to this assumption, as shown by the previous exemplary transformer-design. Thus, let us try putting (9⁴)   $$w_{\text{min}}^2 L_{s4} C_4 = 1.2$$

very roughly, whence the maximum secondary inductance is (13a)
$$L_{s4} = \frac{1.2}{w_{\text{min}}^2 C_4} = \frac{1.2 \times 10^{-6}}{.28274^2 \times .0013} = 11{,}500 \times 10^{-6}$$

henrys, roughly.

(11b⁴)
$$\phi_4 = \tan^{-1}\left(\frac{1}{.28274 \times .0013 \times 450} - \frac{.28274 \times 11,500}{450}\right)$$
$$= \tan^{-1}(6.046 - 7.226) = \tan^{-1}(-1.180) = -49°43'$$

This two-winding transformer would normally (or frequently) be made with heavier wire for the primary. It is also evident, from Equation 13a, that it will have many more turns than the transformer of my first illustration. Both of these factors contribute to make this two-winding transformer have a much smaller coupling-coefficient, which can be initially estimated at $k_4 = 0.46$, or $k_4^2 = 0.2116$, for a first guess. Hence the Fig. 4 circle-diameter should be (11c⁴)
$$\overline{QG_4} = \frac{k_4^2 w_{min} L_{s4}}{R_L} = \frac{0.2116 \times .28274 \times 11,500}{450} = 1.530$$

roughly.

The co-ordinates of the operating-point $P_4$ should be (11d⁴) $R_{P4} = 1.53 \cos^2 49°43' = .640 = \sqrt{.409}$ roughly.

$X_{P4} = 1 - 1.53 \cos 49°43' \sin 49°43' = .245 = \sqrt{.060}$ roughly.

If (for example) we desire a rather low loss of 1.2 decibels at this minimum frequency in the cable $TL_C$, the power-ratio $$P_i/P_0 = \text{antilog } 0.12 = 1.318$$

and hence the standing-wave voltage-ratio $E_B/E_F$ will be (8c⁴) $b = \sqrt{\frac{1.318 - 1.259}{1.318 - 0.794}} = \sqrt{.113} = .336$ approximately, and the center-displacement of the Fig. 7 circle representing the apparent cable-impedance $Z_a$ in terms of the characteristic cable-impedance $R_C$ will be (51⁴) $R_0 = \frac{1 + 0.113}{1 - 0.113} = 1.255 = \sqrt{1.575}$ approximately. Hence, the primary inductance will have to be (9h⁴)
$$L_{p4} = \frac{50 \times 1.255 \times .640 \pm 50\sqrt{.409(1.575 - 1) - .060}}{(.409 + .060) \times .28274 \times 10^6}$$
$$= \frac{40.15 \pm 50\sqrt{.2352 - .0600}}{.469 \times .28274 \times 10^6}$$
$$= 461 \times 10^{-6} \text{ or } 145 \times 10^{-6}$$

henrys, very roughly.

The solution of a transformer-design having a secondary inductance approximating $$L_{s4} = 11,500 \times 10^{-6}$$

henrys, and having a primary inductance approximating either $$L_{p4} = 461 \times 10^{-6} \text{ or } L_{p4} = 145 \times 10^{-6}$$

henrys, while having a coupling-coefficient approximating $k_4 = 0.46$, can be undertaken in various ways. In a two-winding aircore design of the type shown in Fig. 8, counting the inside coil $L_p$, in Fig. 8, as the primary winding which is to have the desired inductance $L_{p4}$, and counting the outside coil $L_2$, in Fig. 8, as the secondary winding which is to have the desired inductance $L_{s4}$, we can obtain a preliminary idea of the relative proportions, or the general shape, which will be needed, by using the following formula for the approximate value of the coupling-coefficient $k_4$, as given in Terman's Formula 87 on page 71:

(13a)
$$k_4 = \frac{a_4^2 x_4}{A_4^2 X_4}$$

where $a_4$ and $A_4$ are the mean radii of the inner and outer coils, respectively, and $x_4$ and $X_4$ are the axial lengths of the respective coils. Thus, the ratio of the two radii will be (13b) $\frac{a_4}{A_4} = \sqrt{k_4}\sqrt{\frac{X_4}{x_4}} = \sqrt{.46}\sqrt{\frac{X_4}{x_4}} = 0.678\sqrt{\frac{X_4}{x_4}}$ Thus, for example, if the outer coil has a length of approximately $X_4 = 1.2$ inches, and the inner coil has a length of approximately $x_4 = 1.1$ inches, and if the inner coil has a mean radius of approximately $a_4 = 1.12$ inches, the outer coil will have a mean radius of approximately (13c) $A_4 = \frac{1.12}{0.678}\sqrt{\frac{1.1}{1.2}} = 1.58$ inches which gives a rough idea of the general proportions which will be required.

Several trials may be necessary, in order to find a transformer approximating the required constants, although only a rough approximation is necessary, as the losses do not vary too rapidly with changes in the transformer-constants, and we will provide a sufficient (but small) number of secondary taps (such as the tap 43) so that we can choose whichever tap which may give the best available operating-conditions for any assigned frequency.

To give one example, we may choose a two-coil transformer-design, wound on a mandrel 39 (Fig. 8) having a radius of 1.0105 inches, and a primary winding or inner coil, corresponding to the coil $L_p$ in Fig. 8, which is wound in 3 layers 40 (Fig. 8), each layer containing 16 turns of No. 15 dcc. enameled wire, which we will assume to have a bare wire-diameter of .057 inch, plus wire-insulation $INS_W$ having a thickness of .0055 inch, making an outside wire-diameter of .068 inch. Let us choose a secondary winding or outer coil, corresponding to the coil $L_2$ in Fig. 8, which is wound in 14 layers 40 (Fig. 8), each layer containing 28 turns of No. 20 dcc. enameled wire, which we will assume to have a bare wire-diameter of .032 inch, plus wire-insulation $INS_W$ having a thickness of .0055 inch, making an outside wire-diameter of .043 inch. Then, if sheet-insulation $INS_S$ having a thickness of .005 inch is used between successive layers of both the primary and the secondary windings, as shown in Fig. 8, we will have the following transformer-dimensions and characteristics:

(13d)
$a_4 = 1.0105 + .073 + \frac{.068}{2} = 1.1175$ inches $A_4 = 1.0105 + 3 \times .068 + 7 \times .043 + 9.5 \times .005 = 1.563$ inches $x_4 = 16 \times .068 - .011 = 1.077$ inches $X_4 = 28 \times .043 - .011 = 1.193$ inches $t_4 = 3 \times .068 + 2 \times .005 - .011 = 0.203$ inch $T_4 = 14 \times .043 + 13 \times .005 - .011 = 0.656$ inch $n_4 = 3 \times 16 = 48$ $N_4 = 14 \times 28 = 392$ $L_{p4} = \frac{.8 \times 1.1175^2 \times 48^2 \times 10^{-6}}{6 \times 1.1175 + 9 \times 1.077 + 2.03} = 125 \times 10^{-6}$ henrys $$L_{s4} = \frac{.8 \times 1.563^2 \times 392^2 \times 10^{-6}}{6 \times 1.563 + 9 \times 1.193 + 6.56} = 11,260 \times 10^{-6} \text{ henrys}$$

$$k_4 = \frac{1.1175^2 \times 1.077}{1.563^2 \times 1.193} = .4615; \quad (\therefore k_4^2 = .2130)$$

$$\overline{QG_4} = \frac{.2130 \times .28274 \times 11,260}{450} = 1.507$$

$$\phi_4 = \tan^{-1}\left(\frac{1}{.28274 \times .0013 \times 450} - \frac{.28274 \times 11,260}{450}\right)$$

$$= \tan^{-1}(6.0459 - 7.0740) = -45°48'$$

$$R_{P4} = 1.507 \cos^2 45°48' = .7322; \quad (\therefore R_{P4}^2 = .5362)$$

$$X_{P4} = 1 - 1.507 \cos 45°48' \sin 45°48' =$$
$$1 - .7530 = .2470; \quad (\therefore X_{P4}^2 = .0610)$$

$$R_{04} = \frac{(.2470 + .0610) \times .28274^2 \times 125^2 + 50^2}{2 \times 50 \times .7322 \times .28274 \times 125} = 1.255$$

$$b_4 = \sqrt{\frac{1.255 - 1}{1.255 + 1}} = \sqrt{.1132} = .3363$$

$$\frac{P_{i4}}{P_{o4}} = \frac{1.2589 - .7944 \times .1132}{1 - .1132} = \text{antilog } 0.1200 = 1.318$$

It is to be noted that whereas we started out with a tentative assumption of a fairly high super-resonance condition in which the secondary reactance $w_{\min}L_{s4}$ was 1.2 times the coupling-capacitor reactance $1/w_{\min}C_4$, at the minimum frequency, our actual design produced a secondary reactance-ratio of (13e)
$$w^2_{\min}L_{s4}C_4 = .28274^2 \times 11,260 \times .0013 = 1.17$$

and our actual minimum-frequency operating-angle turned out to be $\phi_4 = -45°48'$ instead of the initially assumed value of $\phi_4 = -49°43'$. Our decibel-loss in the cable, however, turned out to be $10 \log P_i/P_o = 1.2$, which is precisely what was originally assumed. Our actual secondary inductance $L_{s4}$ turned out to be a trifle lower than the initially assumed value, in the ratio 11,260 to 11,500; and our actual primary inductance $L_{p4}$ turned out to be still lower than the initially assumed value, in the ratio 125 to 145. Our initially assumed value of the coupling-coefficient, $k_4 = 0.46$, proved to be quite adequately close to the actual value, which was $k_4 = 0.4615$.

To determine the range of frequencies over which this two-winding transformer of Equations 13d is operative, with reasonable values of the decibel-loss, instead of assuming that the standing-wave voltage-ratio $b$ (and hence the decibel-loss) remains constant, and increasing the size of the unmatched-coupling circle 42, in inverse ratio to the frequency, as in Figs. 9 and 10 for the autotransformer, (so as to determine whether the operating-point P, for each frequency, falls inside of the unmatched-coupling circle 42 for that frequency), I will now illustrate a different manner in which the performance, at different frequencies, can be estimated, namely, by actually calculating the voltage-ratio $b_{4x}$ for each of a number of frequencies other than the minimum frequency of 45 kilocycles for which the original design was made. Thus, for each frequency $f_{4x}$, we can successively calculate the input-impedance circle-diameter $\overline{QG_{4x}} = k_4 w_{4x} L_{s4}/R_L$, the angle $\phi_{4x}$ from Equation 4b, the co-ordinates ($R_{P4x}$, $X_{P4x}$) of the operating-point $P_{4x}$ from Equations 9c, the Fig. 7 circle-center displacement $R_{04x}$ from Equation 9i, the standing-wave voltage-ratio $b_{4x}$ from Equation 5p, and the decibel-loss which is $10 \log P_{i4x}/P_{o4x}$ from Equation 8b, using the proper values of $w$ in each case.

Table IV shows the results of such a calculation, for the maximum-turn secondary-tap 24 of the two-winding transformer which is defined in Equations 13d, starting out with different assumed values of the frequency $f_{4x}$.

TABLE IV

Two-winding transformer

| $f_{4x}$ | $\overline{QG_{4x}}$ | $\phi_{4x}$ | $R_{p4x}$ | $X_{p4x}$ | $R_{04x}$ | $b_{4x}$ | db-loss |
|---|---|---|---|---|---|---|---|
| 39,000 | 1.306 | +40°12' | 0.762 | 1.644 | 2.391 | .640 | 1.99 |
| 41,000 | 1.373 | +10°49' | 1.325 | 1.253 | 1.304 | .406 | 1.31 |
| 43,000 | 1.440 | −23°25' | 1.213 | .475 | 1.082 | .198 | 1.07 |
| 45,000 | 1.507 | −45°48' | 0.733 | .247 | 1.255 | .336 | 1.20 |
| 47,000 | 1.574 | −58° 0' | .442 | .293 | 1.767 | .526 | 1.575 |
| 49,000 | 1.641 | −65° 4' | .292 | .373 | 2.520 | .657 | 2.08 |
| 51,000 | 1.708 | −69°33' | .2085 | .441 | 3.449 | .742 | 2.62 |
| 53,000 | 1.775 | −72°38' | .153 | .494 | 4.509 | .798 | 3.17 |

$R_c = 50$, $C_4 = .0013 \times 10^{-6}$, $L_{s4} = 11,260 \times 10^{-6}$, $k_4 = .4615$, $b_4 = .3363$, $R_L = 450$, $L_{p4} = 125 \times 10^{-6}$.

Table IV shows that the maximum number of secondary turns on the two-winding transformer defined in Equations 13d suffices for a band of frequencies extending from well below 39 kilocycles (kc.) to 53 kilocycles (kc.), with losses which are always below 3.2 db in the cable TLc; or if the band is extended up to only 49 kc., the cable-losses are always below 2.1 db.

Without going through the calculations for the additional secondary taps (such as 43) which are necessary to couple carrier-currents of higher frequencies to the coupling-capacitor C4 and thence to the power-line TLL, it will suffice to say that four additional secondary taps, at the ends of the twelfth, tenth, eighth, and sixth secondary layers, respectively, in addition to the maximum-turn tap or terminal at the end of the fourteenth secondary layer, will suffice to cover the entire frequency-band from 45 to 150 kc. with cable-losses which need never exceed about 2.2 decibels, and these cable-losses, at most frequencies, can be made even less, by choosing the proper tap. If the frequency-range is to be extended to 165 kc., the six-layer, 168-turn tap will handle this frequency with a cable-loss which is probably less than 3.2 db, or another tap may be provided, with still fewer secondary turns, to provide still lower cable-losses.

In all of these discussions of decibel-losses in the connecting-cable TLc, I am assuming a cable which would have a loss of exactly 1 decibel with perfectly matched coupling-impedances at the least advantageous (that is, usually the highest) frequency, and at the least advantageous (that is, the highest) value of the power-line impulse-impedance RL. Actually, the loss varies with the frequency, and with the length and the other design-constants of the cable, so that, in general, the losses will be less than the figures given, although occasionally the losses may approach, or even exceed, these figures.

It will be noted that my two-winding transformer-design is an example of a design in which I have chosen the smaller of the two calculated primary-inductances corresponding to any desired standing-wave voltage-ratio $b$. In other words, I have chosen the negative sign in front of the radical in Equations 9h and 9h⁴. In my illustrative autotransformer design, which was considered in my first exemplary design-calculation, I chose, by way of example, the larger primary inductance, that is, the positive sign before the radical in Equations 9h and 11e.

From the foregoing mathematical and theoretical discussions, it will be evident that a distinctive feature of my present invention is that the coupling-transformer 14 is not necessarily deliberately designed to produce matched-coupling conditions at any frequency. An important feature of my design is that any given secondary inductance $L_s$, such as is provided by any one of the secondary taps or terminals, 24 or 43, is usable over a range of frequencies such that, at the extreme upper or lower frequencies of this range, the coupling-conditions are definitely mismatched so that a reflected or backward wave $E_B$ is produced.

Consequently, the decibel-losses in the coupling-cable $TL_C$ are necessarily higher than the decibel-losses which would have been encountered under matched-impedance conditions. It is in this way that I am enabled to use a single or specific value of secondary inductance $L_{sx}$ over a material width or range of carrier-current frequencies, so that only a relatively small number of secondary taps 24 and 43 will suffice to cover the entire range of carrier-current frequencies without introducing a prohibitively high decibel-loss in the coupling-apparatus.

Reference to Table IV will show, for example, that a particular value of secondary inductance, such as $L_{s4}$, will operate over a frequency-range between 39 and 49 kilocycles while the standing-wave voltage-ratio $b$ varies from .64 down to .2 or less, and up to .66 again, over this frequency-range, while the cable-loss varies from 2.0 decibels down to 1.1 decibels or less, and up to 2.1 decibels, over this same frequency-range, assuming that the cable-loss would have been 1.0 decibel under exactly matched-impedance conditions. If this frequency-band had been extended to include 53 kilocycles, the standing-wave voltage-ratio $b$ would have reached .8, and the cable-loss would have reached 3.2 decibels.

The exact width of the frequency-band which is served by any one secondary tap of the transformer depends upon the maximum decibel-loss which is to be accepted in the lead-in cable $TL_C$. In order that this frequency-band may have any material width, it is necessary to accept a certain amount of decibel-loss, or a certain standing-wave voltage-ratio $b$, at the extreme end or ends of the acceptable frequency-band, and hence the coupling-transformer 14 must be designed so as to produce at least a certain maximum value of the backward-to-forward voltage-ratio $b$, or a certain maximum amount of decibel-loss, at one or both of the extremes of the frequency-range. In general, the maximum voltage-ratio $b$ will be at least as high as something of the order of 0.5, corresponding to a decibel-loss of 1.5 in a cable which has a 1-decibel loss under matched-impedance conditions; but these figures are to be regarded as average or illustrative figures, as smaller values might be found convenient under some circumstances, particularly when there are overlapping frequency-ranges which are applicable to adjacent secondary taps, and much higher values are frequently found to be quite acceptable, for instance, a voltage-ratio $b$ as high as 0.8, or even slightly higher, and a decibel-loss of 3.2, or even slightly higher.

My coupling-transformer 14 is novel also, in the manner of its design, or in the correlation between the primary inductance $L_p$, the secondary inductance $L_s$, and the coupling-coefficient $k$ of the coupling-transformer, and the characteristic impedances $R_C$ and $R_L$ of the two communication-circuit transmission lines $TL_C$ and $TL_L$, respectively.

It is an important feature of my invention, as hereinabove described, that the secondary-circuit reactance $(wL_s - 1/wc)$ shall be somewhere near resonance (within the limits indicated) at the minimum frequency of the range of frequencies over which that particular value of secondary inductance $L_s$ is to be usable.

It is a feature of my invention that the Fig. 4 circle-diameter $\overline{QG} = k^2 wL_s/R_L$ shall not be too small, with relation to unity, to produce a reasonable ratio of secondary-to-primary inductances, $L_s/L_p$, while at the same time providing a reasonable range of acceptable frequencies, as the operating-point P travels clockwise around a locus of the type shown at $P_f$ in Fig. 9, with increasing values of the frequency.

It is another important feature of my invention to use the primary inductance $L_p$ so that it is correlated with the value of the characteristic impedance $R_C$ of the lead-in cable $TL_C$, so that the value of this impedance is fitted to accommodate the value of the power-line characteristic impedance $R_L$, or to accommodate the varying value of the Fig. 4 circle-diameter $\overline{QG}$, as the frequency $f$, or the angular velocity $w = 2\pi f$, is varied between the lower and upper limits of the frequency-range which is to be served by any given secondary tap.

These and other novel features of my coupling-transformer 14 are described and illustrated in the foregoing specification.

While, as a matter of convenience, I use the term "primary winding" to refer to the side of the transformer 14 which is connected to the short transmission-line or lead-in cable $TL_C$, and the term "secondary winding" to refer to the side of the transformer 14 which is connected to the capacitor C and thence to the long transmission-line or power-line $TL_L$, this usage of terms is not intended to imply that the direction of communication-circuit power-flow is solely from the short line to the long line; as the communication-network is completely reversible as to the direction of current-flow. In fact, the carrier-set E which is connected to the other end of the short line $TL_C$ is illustrated as being both a transmitter for transmitting carrier-current energy to the long line $TL_L$, and a receiver for receiving carrier-current energy which is transmitted from a similar carrier-set (not shown) at the far end of the long line.

Furthermore while, as a matter of convenience, I refer to the transformer 14 as having primary and secondary "windings," I use this terminology in a sense applicable to an auto transformer as well as a two-winding transformer.

It will be noted that I have made no effort to achieve the optimum possible design, that is, the best possible relation between the three transformer-constants, which are the primary inductance $L_p$, the secondary inductance $L_s$, and the coupling-coefficient $k$. In general, the decibel-losses are sufficiently low so that it is not at all necessary to go to the time and expense necessary to find the absolute optimum design-constants. The solution involves trigonometric and logarithmic functions which are practically solvable only by the laborious method of cut and try, and plotting the results for any trends which can be observed, taking care lest one be misled by a tricky reversal of a trend, which may frequently occur with such complicated relationships. Several examples of practical approaches to a design-calculation have been given, which are sufficient to enable anyone skilled in the art to practice my invention, whether the designer wishes to content himself with the first reasonably acceptable design which he achieves, or whether he wishes to work out any given number of designs, so that he can pick out the best one of the bunch. An extremely important novel feature of my transformer is that it can now be defined, in terms of reasonable design-equations and design-procedures, which is more than was ever possible, prior to my present invention, in a transformer designed for mismatched-impedance coupling.

While I have given several concrete illustrations of my invention, and while I have given certain concrete suggestions in regard to design-formulas and design-procedures, I wish it to be understood that my invention is not limited to all of these details, as various departures will suggest themselves to those skilled in the art, possibly in addition to the variations which have already been suggested in this specification. I desire, therefore, that the appended claims shall be accorded the broadest construction consistent with their language.

I claim as my invention:

1. A novel coupling-transformer adapted to couple a carrier-frequency lead-in communication-line cable, having a length which is considerably less than one wavelength of the carrier wave, to a serially connected coupling-transformer and thence to a carrier-frequency communications-transmitting line which is very long as compared to the wavelength of the carrier wave, said coupling-transformer being characterized by having a predetermined value of primary inductance, a predetermined value of secondary inductance, and a predetermined value of coupling-coefficient which are usable over a material range of carrier frequencies, the upper and lower limits of said usable frequency-range producing mismatched-impedance coupling-conditions in which the backward-to-forward standing-wave voltage-ratio is of the order of 0.5 or more in said cable, said voltage-ratio being lower at intermediate frequencies than at said upper and lower frequency-limits, the minimum-frequency backward-to-forward standing-wave voltage-ratio in the cable being between the values of approximately 0.5 and approximately 0.8.

2. The invention as defined in claim 1, characterized by the transformer-constants being such as to provide mismatched-impedance coupling at all frequencies.

3. A novel coupling-transformer adapted to couple a carrier-frequency lead-in communication-line cable, having a length which is considerably less than one wavelength of the carrier wave, to a serially connected coupling-transformer and thence to a carrier-frequency communications-transmitting line which is very long as compared to the wavelength of the carrier wave, said coupling-transformer being characterized by having a predetermined value of primary inductance, a predetermined value of secondary inductance, and a predetermined value of coupling-coefficient which are usable over a material intermediate range of carrier frequencies, less than the aforesaid predetermined range of frequencies, the upper and lower limits of said usable intermediate frequency-range producing mismatched-impedance coupling-conditions in which the backward-to-forward standing-wave voltage-ratio is of the order of 0.5 or more in said cable, said voltage-ratio being lower at intermediate frequencies than at said upper and lower frequency-limits, the minimum-frequency backward-to-forward standing-wave voltage-ratio in the cable being between the values of approximately 0.5 and approximately 0.8, and further characterized by said transformer having a relatively small number of secondary taps, each of which is usable, with the same primary winding, to produce a different intermediate range of usable frequencies, whereby the several different intermediate ranges of usable frequencies will provide acceptable coupling-conditions over the aforesaid predetermined range of frequencies.

4. A novel coupling-transformer adapted to couple a carrier-frequency lead-in communication-line cable, having a length which is considerably less than one wavelength of the carrier wave, to a serially connected coupling-transformer and thence to a carrier-frequency communications-transmitting line which is very long as compared to the wavelength of the carrier wave, said coupling-transformer being characterized by having a predetermined value of primary inductance, a predetermined value of secondary inductance, and a predetermined value of coupling-coefficient which are usable over a material range of carrier frequencies, the lower limit of said usable frequency-range producing coupling-conditions in which the numerical value of the secondary-winding reactance, divided by the numerical value of the capacitor-reactance, is within the limits of approximately $1 \pm 0.2$.

5. A novel coupling-transformer adapted to couple a carrier-frequency lead-in communication-line cable, having a length which is considerably less than one wavelength of the carrier wave, to a serially connected coupling-transformer and thence to a carrier-frequency communications-transmitting line which is very long as compared to the wavelength of the carrier wave, said coupling-transformer having a relatively small number of secondary taps, any one of which may be used for a predetermined range of carrier-frequencies, said coupling-transformer being characterized by having a predetermined value of primary inductance, a maximum-turn value of secondary inductance, and a predetermined value of coupling-coefficient which are usable over a material first intermediate range of carrier frequencies, said first intermediate range starting with the lower limit of the entire range of communication-circuit frequencies over which the system is operative, and said first intermediate range ending with an upper limit which is considerably less than the upper limit of said entire range of frequencies, the lower limit of said first intermediate frequency-range producing coupling-conditions in which the numerical value of the secondary-winding reactance, divided by the numerical value of the capacitor-reactance, is within the limits of approximately $1 \pm 0.2$, the numerical value of the primary-winding reactance, at this lower limit of said first intermediate frequency-range, being such as to adapt the coupling-network to both the characteristic matched-coupling impedance and the mismatched-coupling apparent impedance of said short transmission-line, the ratio of said mismatched-coupling apparent impedance divided by the primary-winding reactance having a magnitude corresponding to a backward-to-forward standing-wave voltage-ratio of the order of 0.5 or more in said cable, the minimum-frequency backward-to-forward standing-wave voltage-ratio in the cable being between the values of approximately 0.5 and approximately 0.8, each intermediate secondary tap producing a secondary turn-number less than the maximum, so as to provide an intermediate value of secondary inductance which is usable, with the same primary winding, to produce a different intermedate range of usable frequencies, whereby the several different intermediate ranges of usable frequencies will provide acceptable coupling-conditions over the aforesaid predetermined range of frequencies.

6. A novel coupling-transformer adapted to couple a carrier-frequency lead-in communication-line cable, having a length which is considerably less than one wavelength of the carrier wave, to a serially connected coupling-transformer and thence to a carrier-frequency communications-transmitting line which is very long as compared to the wavelength of the carrier wave, said coupling-transformer having a relatively small number of secondary taps, any one of which may be used for a predetermined range of carrier-frequencies, said coupling-transformer being characterized by having a predetermined value of primary inductance, a maximum-turn value of secondary inductance, and a predetermined value of coupling-coefficient which are usable over a material first intermediate range of carrier frequencies, said first intermediate range starting with the lower limit of the entire range of communication-circuit frequencies over which the system is operative, and said first intermediate range ending with an upper limit which is considerably less than the upper limit of said entire range of frequencies, the lower limit of said first intermediate frequency-range being at least as low as the frequency which produces secondary-circuit resonance, the numerical value of the primary-winding reactance, at this lower limit of said first intermediate frequency-range, being such as to adapt the coupling-network to both the characteristic matched-coupling impedance and the mismatched-coupling apparent impedance of said short transmission-line, the ratio of said mismatched-coupling apparent impedance divided by the primary-winding reactance having a magnitude corresponding to a backward-to-forward standing-wave voltage-ratio of the order of 0.5 or more in said cable, the minimum-frequency backward-to-forward standing-wave voltage-ratio in the cable being between the values of approximately 0.5 and approximately 0.8, each intermediate secondary tap producing a secondary turn-number less than the maximum, so as to provide an intermediate value of secondary inductance which is usable, with the same primary winding, to produce a different intermediate range of usable frequencies, whereby the several different intermediate ranges of usable frequencies will provide acceptable coupling-conditions over the aforesaid predetermined range of frequencies.

BERNARD E. LENEHAN.

REFERENCES CITED

The following references are of record in the file of this patent:

UNITED STATES PATENTS

| Number | Name | Date |
| --- | --- | --- |
| 1,641,725 | Austin | Sept. 6, 1927 |
| 1,733,553 | Nebel | Oct. 29, 1929 |
| 1,736,852 | Evans | Nov. 26, 1929 |
| 2,336,258 | Kenefake | Dec. 7, 1943 |
| 2,341,519 | Atkinson | Feb. 15, 1944 |